US012629599B2

(12) United States Patent
Xiao et al.

(10) Patent No.: US 12,629,599 B2
(45) Date of Patent: May 19, 2026

(54) DATA MATCHING METHOD AND APPARATUS, DEVICE AND COMPUTER-READABLE STORAGE MEDIUM

(71) Applicant: TENCENT TECHNOLOGY (SHENZHEN) COMPANY LIMITED, Shenzhen (CN)

(72) Inventors: Yi Xiao, Shenzhen (CN); Richeng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 18/450,770

(22) Filed: Aug. 16, 2023

(65) Prior Publication Data

US 2024/0009578 A1     Jan. 11, 2024

Related U.S. Application Data

(63) Continuation of application No. PCT/CN2022/114107, filed on Aug. 23, 2022.

(30) Foreign Application Priority Data

Sep. 14, 2021     (CN) .......................... 202111078985.6

(51) Int. Cl.
*A63F 13/86* (2014.01)
*A63F 13/52* (2014.01)
(Continued)

(52) U.S. Cl.
CPC .............. *A63F 13/86* (2014.09); *A63F 13/52* (2014.09); *H04N 21/2187* (2013.01); *H04N 21/4312* (2013.01); *A63F 13/87* (2014.09)

(58) Field of Classification Search
CPC .......... A63F 13/86; A63F 13/52; A63F 13/87; A63F 13/847; A63F 13/355; A63F 13/79;
(Continued)

(56) References Cited

U.S. PATENT DOCUMENTS

| | | | | |
|---|---|---|---|---|
| 2012/0309511 A1* | 12/2012 | Chung | ............... | H04N 21/4784 463/30 |
| 2014/0274304 A1* | 9/2014 | Haswell | ................ | A63F 13/798 463/23 |

(Continued)

FOREIGN PATENT DOCUMENTS

| | | | | |
|---|---|---|---|---|
| CN | 104796448 A | * | 7/2015 | ............. G06F 9/544 |
| CN | 107680157 A | | 2/2018 | |

(Continued)

OTHER PUBLICATIONS

Fia, "WRC eSports World Finals 2019. Season 4 Live Show using 4 Sim Racing Rigs.", https://www.youtube.com/watch?v=XHpLLCXfsLY&t=331s, Oct. 5, 2019 (Year: 2019).*

(Continued)

*Primary Examiner* — Michael A Cuff
(74) *Attorney, Agent, or Firm* — Anova Law Group, PLLC

(57) ABSTRACT

Embodiments of this application disclose a data matching method and apparatus, a device and a computer-readable storage medium. The method includes displaying a livestreaming page of a first livestreaming room on a livestreaming platform, wherein the first livestreaming room is associated with a first game account in a video game; and in response to a second game account associated with a second livestreaming room entering a battle with the first game account in the video game, displaying information of the second livestreaming room on the livestreaming page.

20 Claims, 15 Drawing Sheets

(51) Int. Cl.

| | |
|---|---|
| *H04N 21/2187* | (2011.01) |
| *H04N 21/431* | (2011.01) |
| *A63F 13/87* | (2014.01) |

(58) Field of Classification Search
CPC .............. A63F 13/795; H04N 21/2187; H04N 21/4312; H04N 21/25891; H04N 21/431; H04N 21/472; H04N 21/4781; H04N 21/4788; H04N 21/4884
USPC ......................................................... 463/31
See application file for complete search history.

(56) References Cited

U.S. PATENT DOCUMENTS

| | | |
|---|---|---|
| 2020/0108316 A1 | 4/2020 | Nay |
| 2024/0009578 A1 | 1/2024 | Xiao et al. |

FOREIGN PATENT DOCUMENTS

| | | | | |
|---|---|---|---|---|
| CN | 111246235 A | 6/2020 | | |
| CN | 111385592 A | 7/2020 | | |
| CN | 111405304 A | 7/2020 | | |
| CN | 111888770 A | 11/2020 | | |
| CN | 112511850 A | 3/2021 | | |
| CN | 112584224 A * | 3/2021 | ......... | H04N 21/4882 |
| CN | 113824983 A | 12/2021 | | |
| DE | 112018001871 T5 * | 2/2020 | ........... | H04N 21/242 |

OTHER PUBLICATIONS

The World Intellectual Property Organization (WIPO) International Search Report for PCT/CN2022/114107 Nov. 1, 2022 7 Pages (including translation).
The State Intellectual Property Office of the People's Republic of China (SIPO) Office Action 1 for 202111078985.6 Dec. 4, 2023 12 Pages (including translation).

* cited by examiner

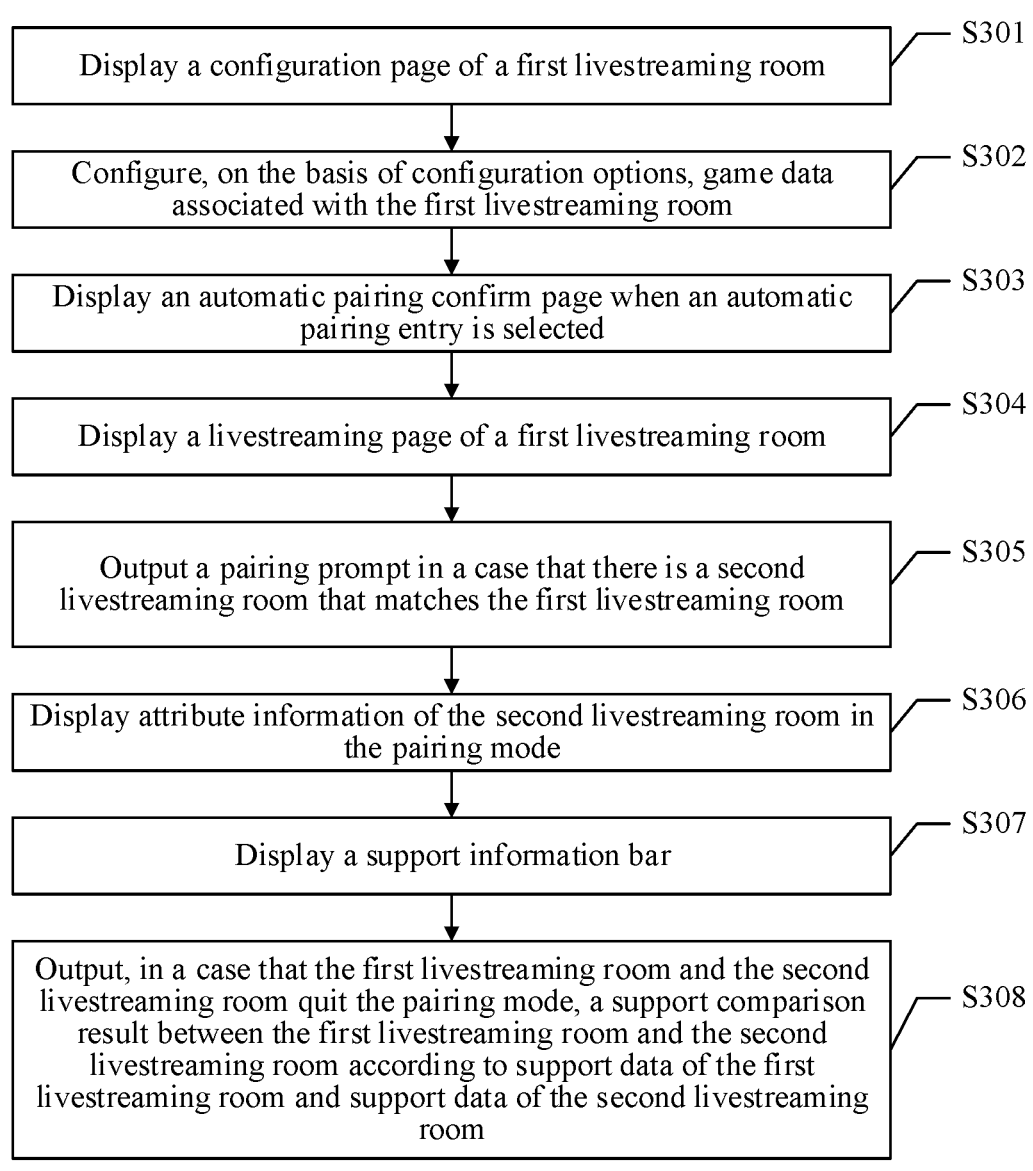

Display a configuration page of a first livestreaming room — S301

Configure, on the basis of configuration options, game data associated with the first livestreaming room — S302

Display an automatic pairing confirm page when an automatic pairing entry is selected — S303

Display a livestreaming page of a first livestreaming room — S304

Output a pairing prompt in a case that there is a second livestreaming room that matches the first livestreaming room — S305

Display attribute information of the second livestreaming room in the pairing mode — S306

Display a support information bar — S307

Output, in a case that the first livestreaming room and the second livestreaming room quit the pairing mode, a support comparison result between the first livestreaming room and the second livestreaming room according to support data of the first livestreaming room and support data of the second livestreaming room — S308

FIG. 3

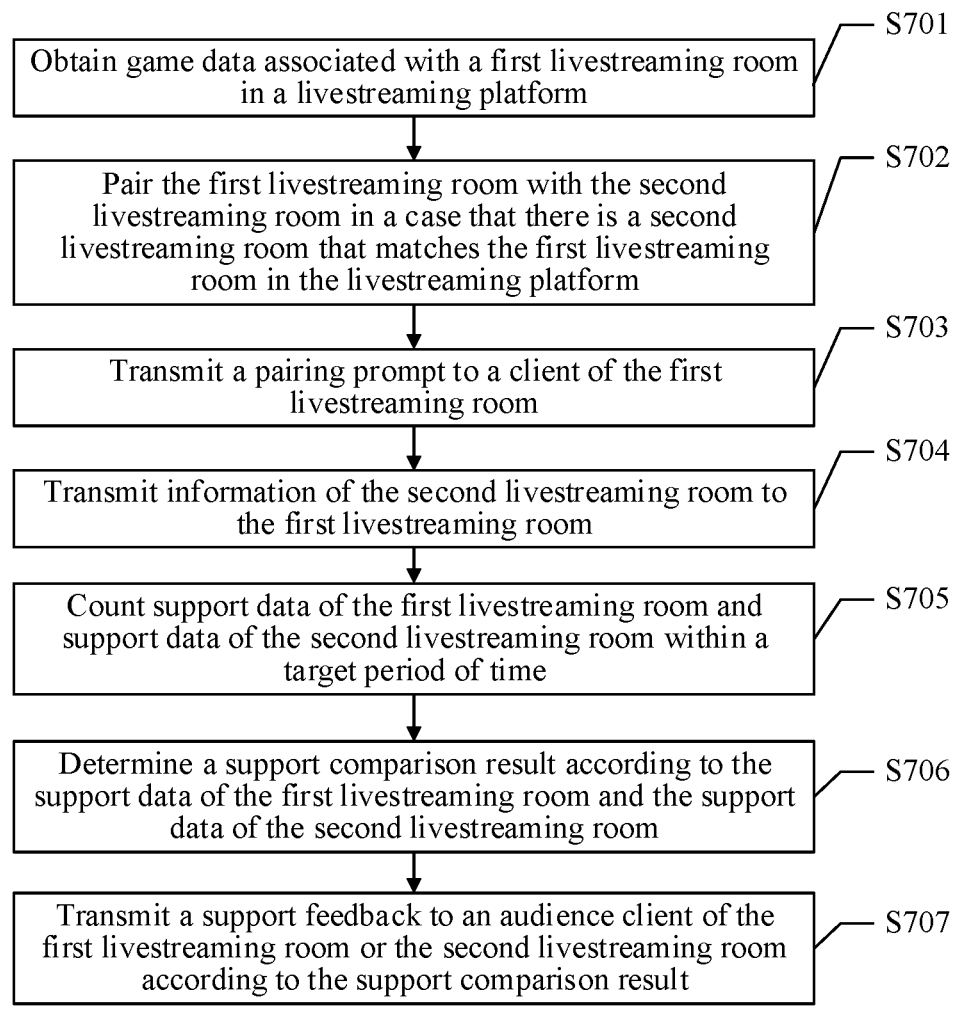

Obtain game data associated with a first livestreaming room in a livestreaming platform — S701

Pair the first livestreaming room with the second livestreaming room in a case that there is a second livestreaming room that matches the first livestreaming room in the livestreaming platform — S702

Transmit a pairing prompt to a client of the first livestreaming room — S703

Transmit information of the second livestreaming room to the first livestreaming room — S704

Count support data of the first livestreaming room and support data of the second livestreaming room within a target period of time — S705

Determine a support comparison result according to the support data of the first livestreaming room and the support data of the second livestreaming room — S706

Transmit a support feedback to an audience client of the first livestreaming room or the second livestreaming room according to the support comparison result — S707

FIG. 7

DATA MATCHING METHOD AND APPARATUS, DEVICE AND COMPUTER-READABLE STORAGE MEDIUM

RELATED APPLICATIONS

This application is a continuation application of PCT Application No. PCT/CN2022/114107, filed on Aug. 23, 2022, which in turn claims priority to Chinese Patent Application No. 202111078985.6, filed with the China National Intellectual Property Administration on Sep. 14, 2021, and entitled "DATA MATCHING METHOD AND APPARATUS, DEVICE AND COMPUTER-READABLE STORAGE MEDIUM." The two applications are incorporated herein by reference in their entirety.

FIELD OF THE TECHNOLOGY

This application relates to the field of computer technologies, specifically to a data matching method, a data matching apparatus, a computer device and a computer-readable storage medium.

BACKGROUND OF THE DISCLOSURE

With the continuous development of computer technologies, livestreaming has attracted more user attention due to its features such as intuitiveness, rich content, strong interactivity and no restriction on territory. Game livestreaming is a hot spot. Game livestreaming refers to a livestreaming form in which a game livestreaming room is opened on a livestreaming platform, a livestreamer plays a game and explains the game in the game livestreaming room, and audience members watch the livestreamer to play the game and listens to the explanations of the livestreamer. In the livestreaming process, the livestreamer can interact with the audience members in the livestreaming room by means of chatting, lottery and the like. However, often the livestreamer talks and the audience members watch the game. This livestreaming mode is monotonous in interaction.

SUMMARY

Embodiments of this application provide a data matching method and apparatus, a device and a computer-readable storage medium, which can enrich interactions in livestreaming rooms and improve the interaction capability of a livestreaming platform.

In one aspect, the embodiments of this application provide a data matching method, which is performed by a computer device. The method includes displaying a livestreaming page of a first livestreaming room on a livestreaming platform, wherein the first livestreaming room is associated with a first game account in a video game; and in response to a second game account associated with a second livestreaming room entering a battle with the first game account in the video game, displaying information of the second livestreaming room on the livestreaming page.

Correspondingly, this application provides a computer device, including:
    one or more processors, configured to load and execute a computer program; and
    a computer-readable storage medium, configured to store a computer program which, when executed by the processor, implements the above data matching method.

Correspondingly, this application provides a computer-readable storage medium, which stores a computer program. The computer program is configured to be loaded by a processor and executes the above data matching method.

In embodiments of this application, a livestreaming page of a first livestreaming room is displayed, where a first virtual object is displayed in the livestreaming page of the first livestreaming room, and the first virtual object is a game character, controlled by a livestreamer client of the first livestreaming room based on a first game account, in a game application; a pairing prompt is output when there is a second livestreaming room that matches the first livestreaming room, where a second virtual object is displayed in a livestreaming page of the second livestreaming room; the second virtual object is a game character, controlled by a livestreamer client of the second livestreaming room based on a second game account, in the game application, and that the first livestreaming room matches the second livestreaming room includes a situation that the first virtual object and the second virtual object are in a same game battle in the game application; and information of the second livestreaming room is displayed in a pairing mode. It can be seen therefrom that in the embodiments of this application, when the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

BRIEF DESCRIPTION OF THE DRAWINGS

In order to clearly illustrate the embodiments of this application or the technical solutions in the prior art, the drawings required to be used in the description of the embodiments or the prior art are briefly introduced below. It is obvious that the drawings in the description below are some embodiments of this application, and those of ordinary skilled in the art can obtain other drawings according to these drawings provided herein without creative efforts.

FIG. 3 shows a schematic flowchart of another data matching method provided according to one embodiment of this application.

FIG. 7 shows a schematic flowchart of a still another data matching method provided according to one embodiment of this application.

DESCRIPTION OF EMBODIMENTS

Figure 1:
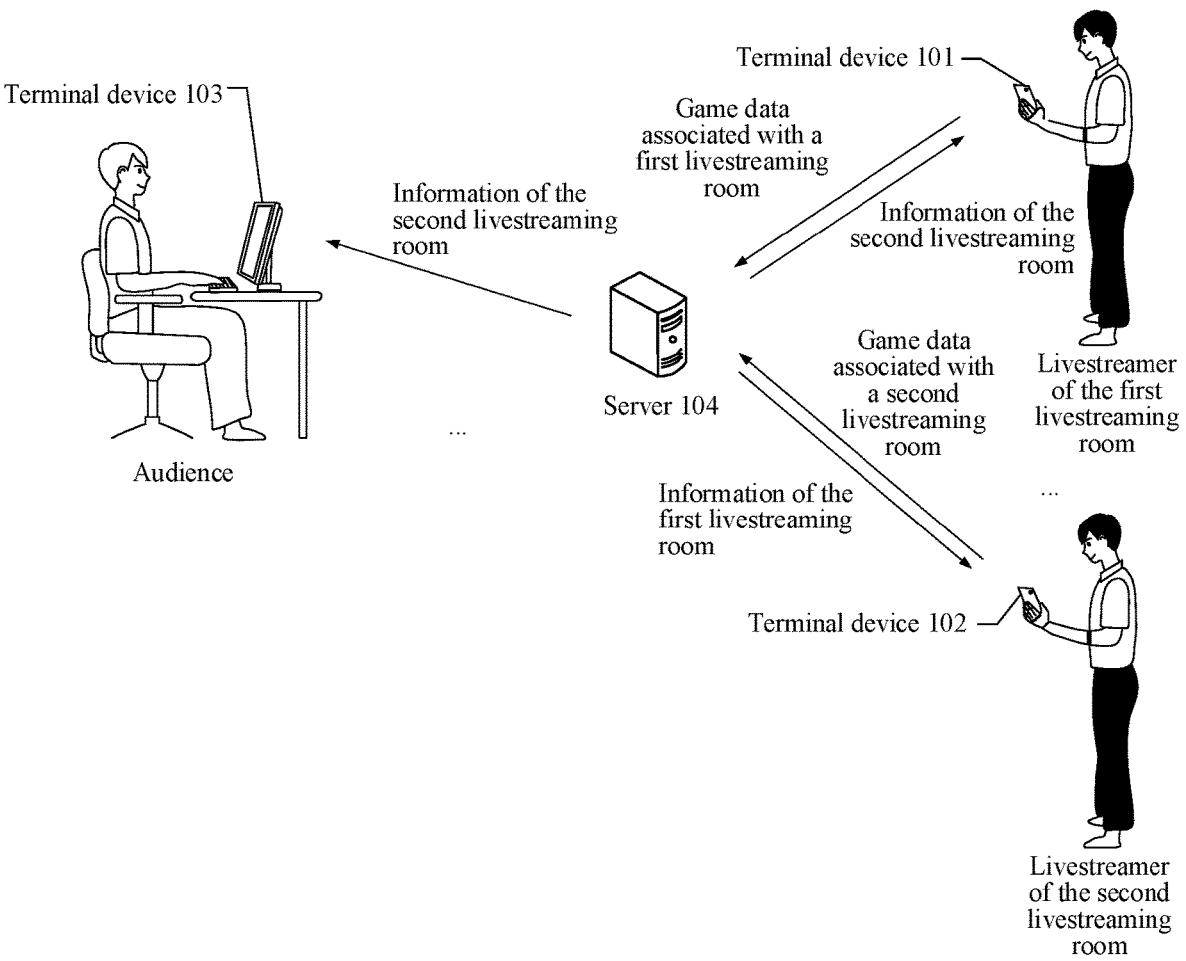
FIG. 1 shows an architecture diagram of data matching provided according to one embodiment of this application.

The technical schemes in the embodiments of this application will be clearly and completely described below with reference to the drawings in the embodiments of this application, and it is obvious that the described embodiments are only a part of the embodiments of this application, but not all of them. Based on the embodiments of this application, all other embodiments obtained by those ordinarily skilled in the art without creative effort shall fall within the protection scope of this application.

Various terms related to the embodiments of this application are set forth below:

The embodiments of this application relate to a livestreaming platform. The livestreaming platform may refer to a network platform with a real-time interaction function using multimedia (such as a text, an image, and a video) channels. The livestreaming platform may include a livestreaming room. The livestreaming room may refer to a network livestreaming show opened by a person or an organization, and the person or organization that opens a livestreaming room may be referred to as a livestreamer of the livestreaming room, while users entering the livestreaming room and watching the network livestreaming show may be referred to as viewers (or audiences) of the livestreaming room. The livestreamer and the audiences in the livestreaming room may interact with each other, such as chatting and giving virtual goods to each other as gifts. Game livestreaming is a popular hot spot. The game livestreaming means a livestreaming form that a game livestreaming room is opened in a livestreaming platform, a livestreamer plays a game and explains the game in the game livestreaming room, and audiences watch the livestreamer to play the game and listens the explanations of the livestreamer. Unless otherwise specified, the livestreaming rooms in the embodiments of this application are described by taking a game livestreaming room as an example.

The embodiments of this application provide a data matching solution applied in a livestreaming platform. The solution includes: In a process of performing game livestreaming in a first livestreaming room in the livestreaming platform, if it is found that there is a second livestreaming room having the following features in the livestreaming platform: (1) the second livestreaming room is associated with the same game application as the first livestreaming room, namely, both a livestreamer of the first livestreaming room and a livestreamer of the second livestreaming room are playing or explaining the same game; and (2) a first virtual object controlled by the livestreamer of the first livestreaming room in the game application and a second virtual object controlled by the livestreamer of the second livestreaming room in the game application are in the same game battle; the livestreaming platform determines that the first livestreaming room matches the second livestreaming room. At this time, information of the second livestreaming room can be pushed to the first livestreaming room, so that a user (the livestreamer or an audience) of the first livestreaming room can interact with a user (the livestreamer or an audience) of the second livestreaming room. In this way, the interaction form of the livestreaming platform is enriched. In addition, after matching between the first livestreaming room and the second livestreaming room succeeds, the audience (the audience of the first livestreaming room or the audience of the second livestreaming room) can also support the livestreamer of the first livestreaming room or the livestreamer of the second livestreaming room. The support can be a kind of network interaction action, which expresses cheer and favor by some actions. Support actions may include, but are not limited to, actions of sending bullet screens, presenting virtual items, subscribing, opening exclusive rights (namely, opening VIP services), and the like.

The embodiments of this application relate to image recognition technology in an Artificial Intelligence (AI) technology. For example, the embodiments of this application can use the image recognition technology in the AI technology to recognize picture data of a livestreaming room, so as to obtain game data associated with the livestreaming room. The game data may include a game application associated with the livestreaming room and a game account used in the game application. For example, features of a game picture on the air in a livestreaming room are extracted, and the features are analyzed to determine what game is on the air in the livestreaming room (namely, the game application associated with the livestreaming room). An identifier (ID) of a virtual object can also be extracted from a key region of the game picture, and a game character controlled by a livestreamer of the livestreaming room can be obtained.

The data matching solution of the embodiments of this application is described in detail below in combination with the accompanying drawings.

Referring to FIG. 1, FIG. 1 shows an architecture diagram of data matching provided according to one embodiment of this application. As shown in FIG. 1, the architecture diagram includes a terminal device 101, a terminal device 102, a terminal device 103, and a server 103. The terminal device 101 is a device used by a livestreamer in a first livestreaming room; the terminal device 102 is a device used by a livestreamer in a second livestreaming room; and the terminal device 103 is a device used by an audience in the first livestreaming room. Terminal devices 101-103 each carry a client of a livestreaming platform. It is understood that the architecture shown in FIG. 1 is illustrative only and is not intended to limit the scope of protection of the embodiments of this application. In some embodiments, the number of the terminal devices 101-103 may be one or more. The forms of the terminal devices 101-103 are merely for example; and the terminal devices 101-103 may include but are not limited to: devices with video playing and collecting functions such as a smartphone (such as an Android mobile phone and an iOS mobile phone), a tablet, a portable personal computer, a mobile Internet device (MID), a video acquirer (player) and a vehicle-mounted terminal. When a livestreamer client or an audience client is carried in a vehicle-mounted terminal, a livestreamer or an audience can enter a livestreaming room in the livestreaming platform through the vehicle-mounted terminal and initiate or watch livestreaming content in the livestreaming room.

The server 104 is a device that can match livestreaming rooms according to game data associated with the livestreaming rooms. The server 104 may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, content delivery networks (CDNs), big data, and artificial intelligence platforms. The terminal device 101 to the terminal device 103 and the server 104 may be directly or indirectly connected through wired or wireless communication, which is not limited in this application.

In one embodiment of data matching shown in FIG. 1, a processing flow of data matching includes the following steps:

(1) The server 104 receives game data associated with various livestreaming rooms in a livestreaming platform, where the game data associated with each livestreaming room includes a game application associated with the livestreaming room, and a game account used by a livestreamer client of the livestreaming room in the game application. The livestreaming platform includes a first livestreaming room, and the first livestreaming room may refer to any livestreaming room in the livestreaming platform. The server 104 may determine, according to the game data associated with the various livestreaming rooms, whether a second livestreaming room that matches the first livestreaming room exists in the livestreaming platform. The second livestreaming room may be any livestreaming room with the game data matching the game data of the first livestreaming room in the livestreaming platform, and the first livestreaming room and the second livestreaming room are different. For example, the server 104 can determine, by means of identifiers of game applications livestreamed in the livestreaming rooms or by means of picture data of the various livestreaming rooms, whether the same game application is livestreamed in the first livestreaming room and the second livestreaming room. If the same game application is livestreamed in the first livestreaming room and the second livestreaming room, the server 104 determines, by means of a first game account used by a livestreamer client of the first livestreaming room in the game application and a second game account used by a livestreamer client of the second livestreaming room in the game application, whether a first virtual object and a second virtual object are in the same game battle in the game application. The first virtual object is displayed in a livestreaming page of the first livestreaming room, and the second virtual object is displayed in a livestreaming page of the second livestreaming room. If the first virtual object and the second virtual object are in the same game battle in the game application, it is determined that the first livestreaming room and the second livestreaming room match.

(2) If the server 104 detects, based on the game data associated with the various livestreaming rooms, that a second livestreaming room that matches the first livestreaming room exists in the livestreaming platform, on the one hand, the server 104 pairs the first livestreaming room with the second livestreaming room. The pairing here mainly includes establishing a matching relationship between the first livestreaming room and the second livestreaming room, and allocating processing resources (such as computing resources) for the first livestreaming room and the second livestreaming room having the matching relationship, to provide a technical support for subsequent interactions between the first livestreaming room and the second livestreaming room. For example: After the matching relationship between the first livestreaming room and the second livestreaming room is established, the audience may support the livestreamer of the first livestreaming room or the livestreamer of the second livestreaming room which are paired with each other. The server 104 may use the computing resources allocated during the pairing to count support data of the livestreamer of the first livestreaming room or the livestreamer of the second livestreaming room respectively, and also support statistically obtaining a support comparison result of the first livestreaming room and the second livestreaming room based on the support data. In one embodiment, if the matching relationship has been established between the first livestreaming room and the second livestreaming room, the first livestreaming room and the second livestreaming room are in a pairing mode. In order to ensure normal operation of a pairing mechanism in the livestreaming platform, in this pairing mode, the first livestreaming room cannot be paired with other livestreaming rooms in the livestreaming platform, and likewise, the second livestreaming room cannot be paired with other livestreaming rooms. After the matching relationship between the first livestreaming room and the second livestreaming room is canceled, and they quit the pairing mode, the first livestreaming room and the second livestreaming room may be paired with other livestreaming rooms in the livestreaming platform again.

On the other hand, server 104 sends a pairing prompt to the terminal device 101 carrying the livestreamer client of the first livestreaming room. The pairing prompt is used for prompting a user of terminal device 101 (namely, the livestreamer of the first livestreaming room) that the first livestreaming room and the second livestreaming room enter a pairing mode. The pairing prompt may include attribute information of the second livestreaming room, such as a livestreamer identifier of the second livestreaming room and an identifier of the second livestreaming room. The server further sends information of the second livestreaming room to the terminal device 103 carrying the audience client of the first livestreaming room, for example, a livestreaming image of the second livestreaming room, the identifier of the second livestreaming room, an entry of the second livestreaming room, and the like. Similarly, the server 104 sends a pairing prompt to the terminal device 102 carrying the livestreamer client of the second livestreaming room, the pairing prompt being used for prompting a user of the terminal device 102 (namely, the livestreamer of the second livestreaming room) that the first livestreaming room and the second livestreaming room enter a pairing mode, and sends information of the first livestreaming room to the terminal device carrying the audience client of the second livestreaming room.

(3) A livestreaming page of the first livestreaming room is displayed in terminal device 101 carrying the livestreamer client of the first livestreaming room. A first virtual object is displayed in the livestreaming page of the first livestreaming room, and the first virtual object is a game character, controlled by the livestreamer client of the first livestreaming room based on the first game account, in the game application. When the terminal device 101 receives the pairing prompt which is transmitted by the server 104 and is used for prompting the user (namely, the livestreamer of the first livestreaming room) of the terminal device 101 that there is a second livestreaming room that matches the first livestreaming room, the pairing prompt is output, to prompt the livestreamer of the first livestreaming room that the first livestreaming room and the second livestreaming room enter the pairing mode, and the information of the second livestreaming room is displayed in the pairing mode of the first livestreaming room and the second livestreaming room. For example, the identifier of the second livestreaming room is displayed. The implementation of the terminal device 102 carrying the livestreamer client of the second livestreaming room is similar to that of the terminal device 101 and will not be described repeatedly herein.

(4) A livestreaming page of the first livestreaming room is displayed in terminal device 103 carrying the audience client of the first livestreaming room. A first virtual object is displayed in the livestreaming page of the first livestreaming room, and the first virtual object is a game character, controlled by the livestreamer client of the first livestreaming room based on the first game account, in the game application. When the terminal device 103 receives the pairing prompt which is transmitted by the server 104 and is used for prompting the user (namely, the audience of the first livestreaming room) of the terminal device 103 that there is a second livestreaming room that matches the first livestreaming room, the pairing prompt is output, to prompt the audience of the first livestreaming room that the first livestreaming room and the second livestreaming room enter the pairing mode, and the information of the second livestreaming room is displayed in the pairing mode of the first livestreaming room and the second livestreaming room. For example, the identifier of the second livestreaming room, the entry of the second livestreaming room, the picture data of the second livestreaming room, and the like are displayed.

In this embodiment, the server can determine the second livestreaming room that matches the first livestreaming room based on the game data associated with the various livestreaming rooms, and transmit the pairing prompt and the information of the second livestreaming room to the client of the first livestreaming room. After the client of the first livestreaming room receives the pairing prompt and the information of the second livestreaming room, the pairing prompt is output, and the information of the second livestreaming room is displayed in the pairing mode. It can be seen from the above that in this embodiment, by obtaining the game data (including the game characters controlled by the livestreamers in the game applications) associated with the livestreaming rooms in the livestreaming platform, if it is found that the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

Figure 2:
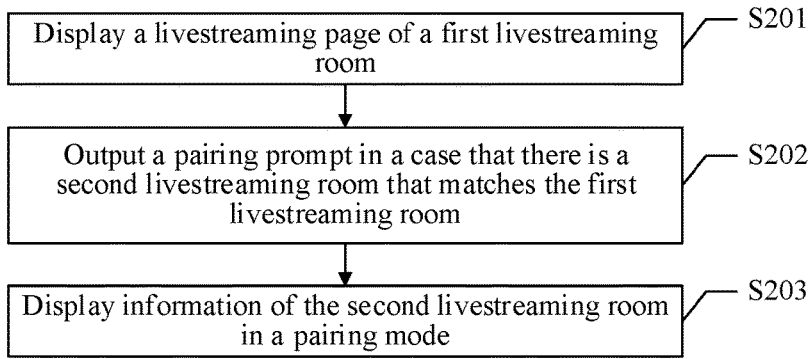
FIG. 2 shows a schematic flowchart of a data matching method provided according to one embodiment of this application.

Based on the above data matching scenario, the embodiments of this application provide a data matching method. FIG. 2 shows a schematic flowchart of a data matching method provided according to one embodiment of this application. In this embodiment, a data matching method can be performed by a computer device. The computer device may be terminal device 101 or the terminal device 103 in the data matching scenario shown in FIG. 1. Referring to FIG. 2, the data matching method may include S201-S203:

S201. Display a livestreaming page of a first livestreaming room.

The first livestreaming room may be any livestreaming room in a livestreaming platform, a first virtual object is displayed in a livestreaming page of the first livestreaming room, and the first virtual object may be a game character, controlled by a livestreamer client of the first livestreaming room based on a first game account, in a game application.

In one embodiment, the livestreaming page of the first livestreaming room is displayed in the livestreamer client of the first livestreaming room, and the livestreamer client refers to a client carried by a terminal device used by a livestreamer of the first livestreaming room. With regard to the livestreamer client of the first livestreaming room, the livestreaming page may further include a bullet screen display bar of the first livestreaming room, a virtual resource transfer record bar of the first livestreaming room, a game data configuration entry associated with the first livestreaming room, an interaction setting entry of the first livestreaming room, an automatic pairing entry of the first livestreaming room, and the like. The virtual resource transfer record bar is used for displaying a virtual resource transfer record of the first livestreaming room. The game data configuration entry is used for configuring a definition, an identifier and the like of the first livestreaming room. The interaction setting entry is used for initiating an interaction activity of the first livestreaming room. When the automatic pairing entry is in a selected state, the first livestreaming room is automatically paired in the process of displaying the livestreaming page of the first livestreaming room.

In another implementation, the livestreaming page of the first livestreaming room is displayed in an audience client of the first livestreaming room, and the audience client refers to a client carried by a terminal device used by an audience of the first livestreaming room. With regard to the audience client of the first livestreaming room, the livestreaming page may further include one or more of the following items: a bullet screen display bar of the first livestreaming room, a bullet screen input bar of the first livestreaming room, a virtual resource transfer entry, an advertisement window, a function information bar, and the like. The virtual resource transfer entry can be used for viewing the number of currently owned virtual resources and transferring virtual resources to the livestreamer of the first livestreaming room. The advertisement window can be used for displaying advertisement information of the livestreaming platform. The function information bar can be used for viewing a contribution list of the first livestreaming room, livestreamer information of the first livestreaming room, and the like.

S202. Output a pairing prompt when there is a second livestreaming room that matches the first livestreaming room.

A second virtual object is displayed in a livestreaming page of the second livestreaming room. The second virtual object is a game character, controlled by a livestreamer client of the second livestreaming room based on the second game account, in the game application. That the first livestreaming room matches the second livestreaming room includes a situation where the first virtual object and the second virtual object are in the same game battle in the game application. The first game account and the second game account are in an account list of the same game battle of the game application.

The pairing prompt is used for prompting the first livestreaming room and the second livestreaming room enter a pairing mode. The outputting the pairing prompt may specifically include displaying pairing prompt information and displaying an animation related to the pairing prompt. The pairing prompt can also be output by voice or vibration, which is not limited in this application. In one embodiment, the pairing mode means that the first livestreaming room and the second livestreaming room are connected for PK.

S203. Display information of the second livestreaming room in a pairing mode.

The information of the second livestreaming room may include: an identifier of the second livestreaming room, for example, a room name and a room number of the second livestreaming room; a livestreamer identifier of the second livestreaming room, for example, a chathead and a nickname of the livestreamer of the second livestreaming room; an entry of the second livestreaming room; and a livestreaming page of the second livestreaming room.

In one embodiment, with regard to the livestreamer client of the first livestreaming room, the displaying information of the second livestreaming room in the pairing mode refers to: displaying the identifier of the second livestreaming room and the livestreamer of the second livestreaming room in the pairing mode, so that the livestreamer of the first livestreaming room can learn about the relevant information of the paired second livestreaming room.

In another implementation, with regard to the audience client of the first livestreaming room, the displaying information of the second livestreaming room in the pairing mode refers to: displaying the entry of the second livestreaming room in the pairing mode, so that an audience of the first livestreaming room enters the second livestreaming room through the entry; or, displaying the livestreaming page of the second livestreaming room in the pairing mode, so that an audience of the first livestreaming room can simultaneously watch livestreaming contents of both the first livestreaming room and the second livestreaming room.

It is understood that with regard to the audience client of the first livestreaming room, the entry of the second livestreaming room and the picture data of the second livestreaming room can be both displayed in the pairing mode.

In the embodiments of this application, a livestreaming page of a first livestreaming room is displayed, where a first virtual object is displayed in the livestreaming page of the first livestreaming room, and the first virtual object is a game character, controlled by a livestreamer client of the first livestreaming room based on a first game account, in a game application; a pairing prompt is output when there is a second livestreaming room that matches the first livestreaming room, where a second virtual object is displayed in a livestreaming page of the second livestreaming room; the second virtual object is a game character, controlled by a livestreamer client of the second livestreaming room based on a second game account, in the game application, and that the first livestreaming room matches the second livestreaming room includes a situation that the first virtual object and the second virtual object are in a same game battle in the game application; and information of the second livestreaming room is displayed in a pairing mode. It can be seen therefrom that in the embodiments of this application, when it is determined that the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

Based on the above data matching scenario, the embodiments of this application provide a data matching method. FIG. 3 shows a schematic flowchart of another data matching method provided according to one embodiment of this application. In this embodiment, a data matching method can be performed by a computer device. The computer device may be terminal device 101 in the data matching scenario shown in FIG. 1. Referring to FIG. 3, the data matching method may include S301-S308 below:

S301. Display a configuration page of the first livestreaming room.

Figure 4A:
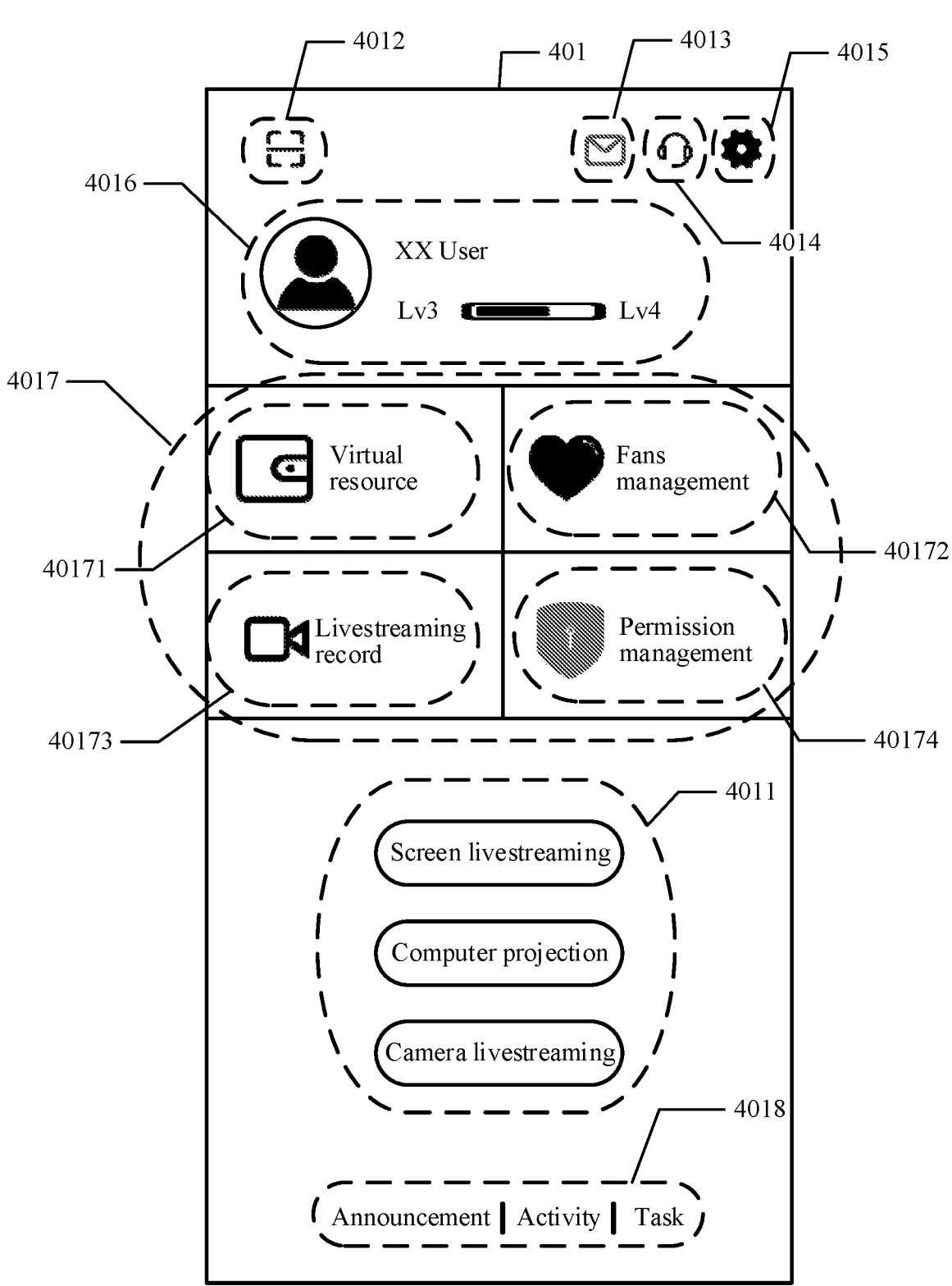
FIG. 4a shows a schematic diagram of a user page provided according to one embodiment of this application.

In one embodiment, when getting ready to start livestreaming, a livestreamer of the first livestreaming room may enter the configuration page of the first livestreaming room through a user page. FIG. 4a shows a schematic diagram of a user page provided according to one embodiment of this application. As shown in FIG. 4a, user page 401 includes a configuration page entry 4011 of the first livestreaming room. There may be a plurality of configuration page entries 4011. Different configuration page entries correspond to different livestreaming methods. For example, "screen livestreaming" corresponds to performing livestreaming using a mobile terminal (such as a mobile phone); "computer projection" corresponds to performing livestreaming using a computer; and "camera livestreaming" corresponds to performing livestreaming using a camera. The livestreamer of the first livestreaming room may enter the configuration page of the first livestreaming room by triggering the configuration page entry 4011 of the first livestreaming room. With regard to one game application, the livestreamer of the first livestreaming room may be configured with a plurality of game accounts.

In one embodiment, the user page 401 may also include one or more of the following items: a two-dimensional code scanning entry 4012, the two-dimensional code scanning entry 4012 being used for entering a two-dimensional code scanning page; an information viewing entry 4013, the information viewing entry 4013 being used for viewing private messages; a customer service entry 4014, the customer service entry 4014 being used for contacting customer services of the livestreaming platform; a personal information setting entry 4015, the personal information setting entry 4015 being used for setting personal information, such as modifying a user name; a user information display region 4016, the user information display region 4016 being used for displaying an identifier and relevant information of a user, such as a user name, a user chathead, a personal signature and a user experience point; a livestreaming room management region 4017, the livestreaming room management region 4017 being used for entering a relevant management page of a livestreaming room; and a message viewing bar 4018, the message viewing bar 4018 being used for viewing relevant information of the livestreaming platform, such as viewing announcements, activities, tasks and the like of the livestreaming platform. As shown in FIG. 4*a*, the livestreaming room management region 4017 may specifically include: an entry 40171 to a virtual resource page used for viewing a virtual resource transfer record in a livestreaming process, an entry 40172 to a fans management page used for managing fans of a livestreaming room, an entry 40173 to Livestreaming Record used for viewing a livestreaming record, and an entry 40174 to a management page used for setting a permission to a livestreaming room.

The configuration page of the first livestreaming room is configured with configuration options. The configuration options may specifically include: a title configuration option, the title configuration option being used for configuring a title of the first livestreaming room; an application configuration option, the application configuration option being used for configuring an identifier of the game application associated with the first livestreaming room; an account configuration option, the account configuration option being used for binding one or more game accounts corresponding to the game application, including the first game account used during the livestreaming of the game application; a definition configuration option, the definition configuration option being used for configuring a definition of the picture data; and a cover configuration option, the cover configuration option being used for configuring a cover image of a first livestreaming room. In addition, the configuration page of the first livestreaming room may further include a parameter confirm button. The parameter confirm button is used for confirming parameters configured in the various configuration options.

Figure 4B:
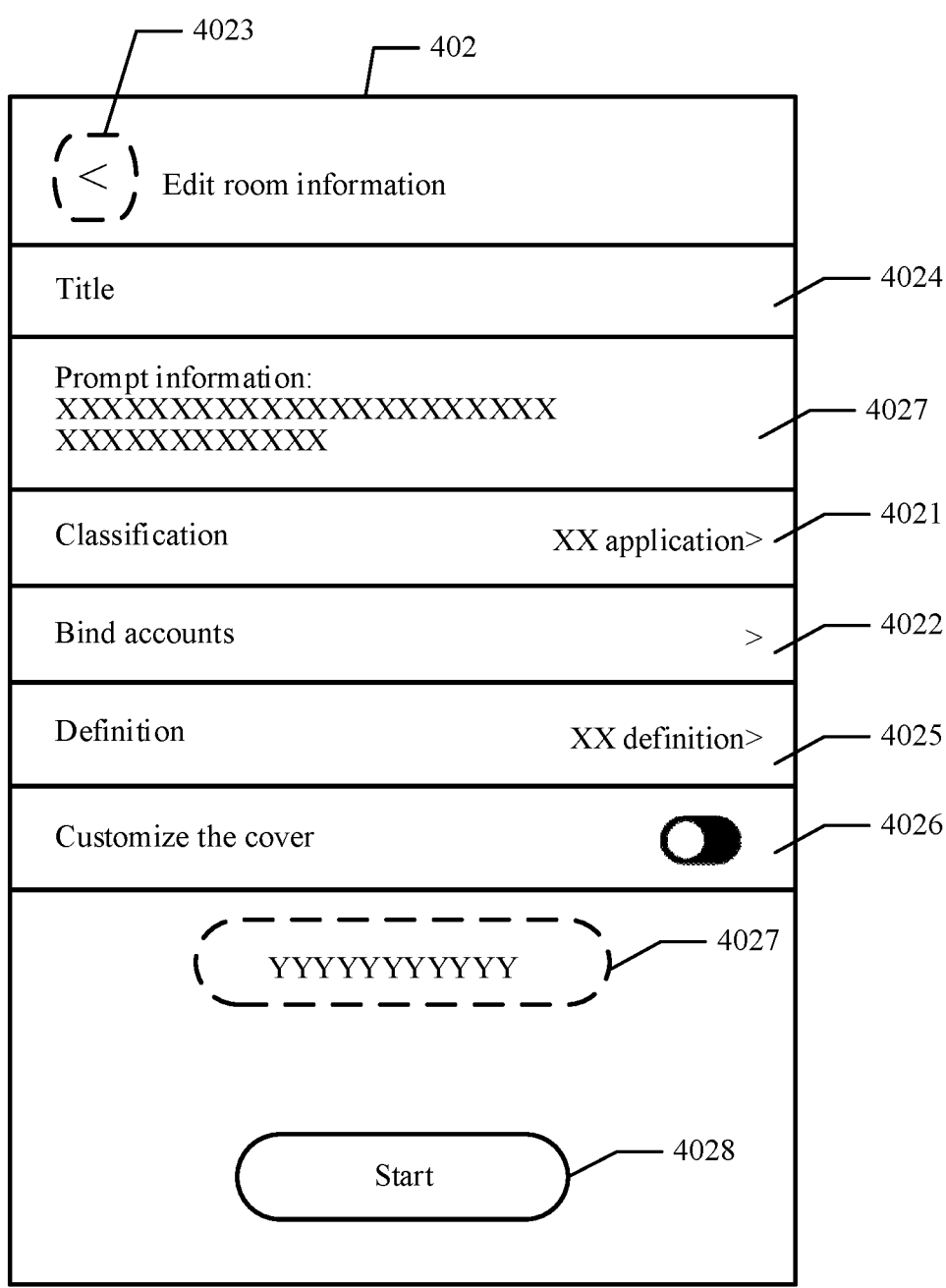
FIG. 4b shows a schematic diagram of a configuration page of a first livestreaming room provided according to another embodiment of this application.

FIG. 4*b* shows a schematic diagram of a configuration page of a first livestreaming room provided according to another embodiment of this application. As shown in FIG. 4*b*, the configuration page 402 of the first livestreaming room includes an application configuration option 4021 and an account configuration option 4022. The livestreamer of the first livestreaming room may configure an identifier of a livestreaming application via the application configuration option 4021 and configure an account used in livestreaming via the account configuration option 4022. In addition, the configuration page of the first livestreaming room may further include a back button 4023, the back button 4023 being used for returning to a previous page, such as the user page; a title configuration option 4024, the title configuration option 4024 being used for configuring a title of a livestreaming room; a definition configuration option 4025, the definition configuration option 4025 being used for configuring an image resolution of a livestreaming room; a cover configuration option 4026, the cover configuration option 4026 being used for configuring a cover picture of a livestreaming room; a prompt information display region 4027, the prompt information display region 4027 being used for displaying system prompt information; and a parameter confirm button 4028, the parameter confirm button 4028 being used for confirming parameters in the above configuration options and starting a livestreaming.

S302. Configure, based on the configuration options, game data associated with the first livestreaming room.

The game data associated with the first livestreaming room includes a game application associated with the first livestreaming room, and a first game account used by the livestreamer client of the first livestreaming room in the game application. After obtaining the game data configured in the configuration options and associated with the first livestreaming room, a terminal device of the livestreamer of the first livestreaming room sends the game data associated with the first livestreaming room to a server, so that the server searches, in the livestreaming platform according to the game data associated with the first livestreaming room, whether there is a second livestreaming room which can be paired with the first livestreaming room currently.

S303. Display an automatic pairing confirmation page when an automatic pairing entry is selected.

The first livestreaming room is configured with the automatic pairing entry. When the automatic pairing entry is in a selected state, the first livestreaming room is automatically paired in the process of displaying the livestreaming page of the first livestreaming room. In this embodiment, the automatic pairing entry can be in different forms. For example, the automatic pairing entry may be configured in the livestreaming management page of the first livestreaming room, or may be configured in the configuration page of the first livestreaming room. When the automatic pairing entry is in the selected state (for example, the livestreamer of the first livestreaming room opens an automatic pairing function), automatic pairing of the first livestreaming room is triggered in the process of displaying the livestreaming page of the first livestreaming room. The server may search, in the livestreaming platform based on the game data associated with the first livestreaming room, whether there is a second livestreaming room that can be paired with the first livestreaming room.

Figure 4C:
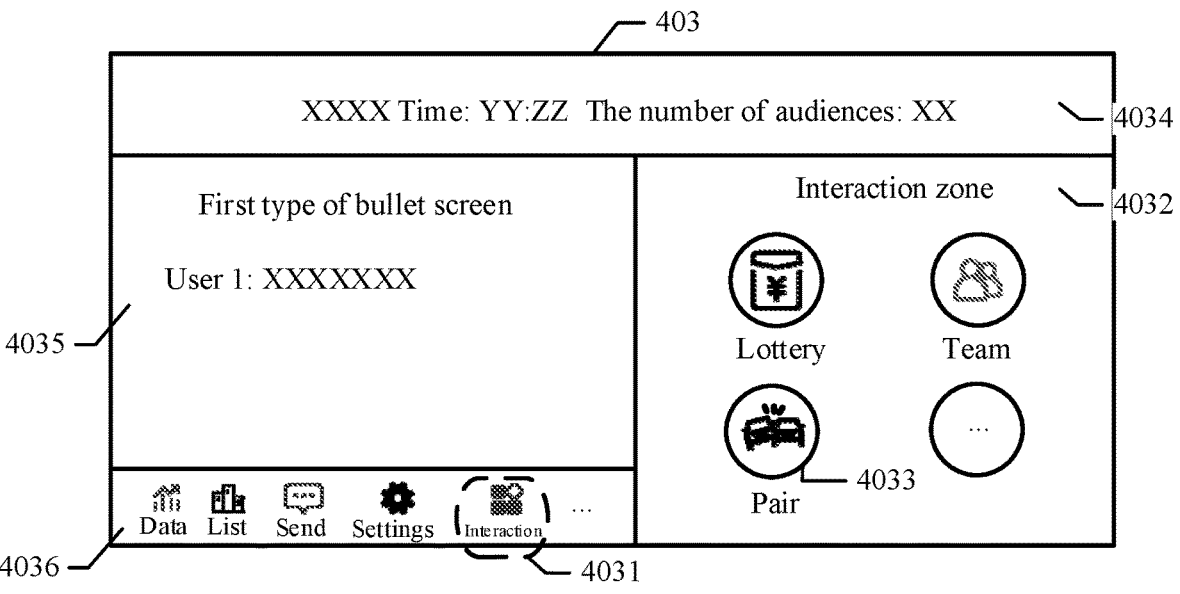
FIG. 4c shows a schematic diagram of a livestreaming management page of a first livestreaming room provided according to another embodiment of this application.

In one embodiment, in response to that the game data in the configuration page of the first livestreaming room is confirmed, the livestreaming management page of the first livestreaming room is displayed, and the automatic pairing entry is configured in the livestreaming management page of the first livestreaming room. FIG. 4*c* shows a schematic diagram of a livestreaming management page of a first livestreaming room provided according to another embodiment of this application. As shown in FIG. 4*c*, the livestreaming management page 403 of the first livestreaming room includes an interaction entry 4031. The interaction entry 4031 is used for opening an interaction window. When the interaction entry 4031 is triggered, an interaction window 4032 is displayed. The interaction window 4032 includes at least one interaction option entry, such as a lottery entry and a team forming entry. The interaction window 4032 includes an automatic pairing entry 4033. The automatic pairing entry 4033 can be used for entering the automatic pairing confirmation page. In addition, the livestreaming management page 403 of the first livestreaming room may further include a relevant information bar 4034 of the first livestreaming room, the relevant information bar 4034 being used for displaying a duration of a livestreaming, the number of audiences, and the like; a bullet screen display bar 4035, the bullet screen display bar 4035 being used for displaying a bullet screen in the first livestreaming room, for example, a first type of bullet screen; and an option bar 4036, the option bar 4036 including relevant entries of the first livestreaming room, for example, a data viewing entry, a list viewing entry, a bullet screen transmission entry, a setting page entry and an interaction entry of the first livestreaming room.

When the automatic pairing entry 4033 is selected, the automatic pairing confirmation page is displayed. A first option and a second option are further configured in the automatic pairing confirmation page. The first option is used for keeping the automatic pairing entry in the selected state, and the second option is used for relieving the selected state of the automatic pairing entry. For example, the first option is selected to keep the automatic pairing entry in the selected state. For example, an automatic pairing start option is selected to start automatic pairing. The second option is selected to relieve the selected state of the automatic pairing entry. For example, an automatic pairing stop option is selected to stop automatic pairing. In addition, the automatic pairing confirmation page may further include automatic pairing function description information.

Figure 4D:
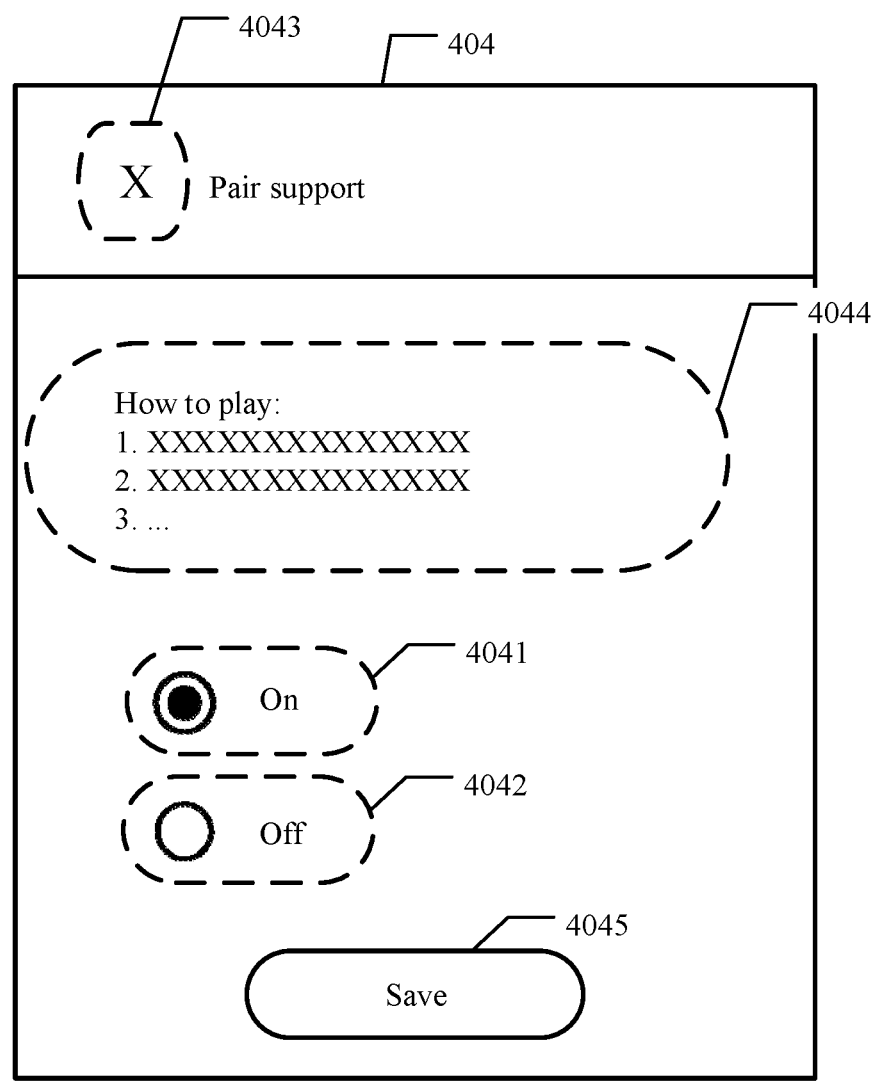
FIG. 4d shows a schematic diagram of an automatic pairing confirmation page of a first livestreaming room provided according to one embodiment of this application.

FIG. 4d shows a schematic diagram of an automatic pairing confirmation page of a first livestreaming room provided according to one embodiment of this application. As shown in FIG. 4d, the automatic pairing confirmation page 404 includes a first option 4041, the first option 4041 being used for starting the automatic pairing, that is, keeping the automatic pairing entry in the selected state; and a second option 4042, the second option 4042 being used for stopping the automatic pairing, that is, releasing the selected state of the automatic pairing entry. In addition, the automatic pairing confirmation page 404 may further include a back button 4043, the back button 4043 being used for returning to a previous page, such as the livestreaming management page; and an automatic pairing function description information display region 4044 and a save button 4045, the save button 4045 being used for saving configurations of the first option 4041 and the second option 4042 in the automatic pairing confirmation page 404.

Figure 4E:
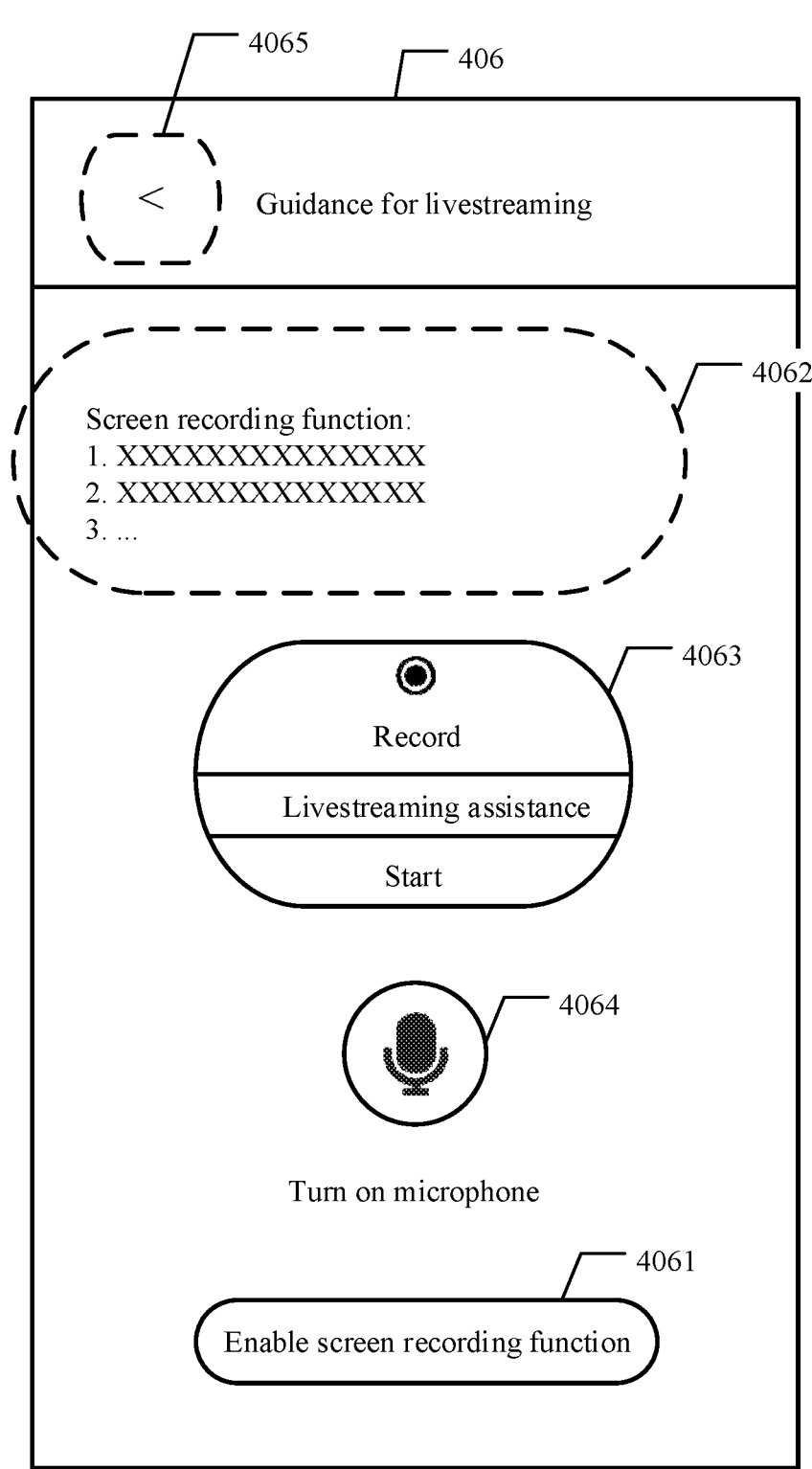
FIG. 4e shows a schematic diagram of a guidance page provided according to one embodiment of this application.

In one embodiment, when the save button 4045 is selected, a guidance page is displayed. The guidance page is used for guiding the livestreamer of the first livestreaming room to turn on an image recognition and interface data recognition capability, and the guidance page includes a screen recording button. The screen recording button is used for enabling a screen recording function. In addition, the guidance page may also include screen recording function description information. The automatic pairing confirmation page further includes a function option button, the function option button being used for enabling a livestreaming assistant, and the livestreaming assistant being used for assisting the livestreamer in the first livestreaming room in livestreaming, such as shielding a malicious bullet screen; and a microphone control button, the microphone control button being used for controlling a microphone state. FIG. 4e shows a schematic diagram of a guidance page provided according to one embodiment of this application. As shown in FIG. 4e, the guidance page 406 includes a screen recording button 4061, a screen recording function description information display region 4062, a function option button 4063, a microphone control button 4064 and a back button 4065. The back button 4065 is used for returning to a previous page, such as the automatic pairing confirmation page.

In another implementation, the automatic pairing entry is configured in the configuration page of the first livestreaming room. The livestreamer of the first livestreaming room may select the automatic pairing entry before livestreaming, to trigger automatic pairing of the first livestreaming room in the process of displaying the livestreaming page of the first livestreaming room.

S304. Display a livestreaming page of a first livestreaming room.

S305. Output a pairing prompt when there is a second livestreaming room that matches the first livestreaming room.

Specific implementations of S304 and S305 can refer to the implementations of S201 and S202 in FIG. 2, which will not be described in detail here.

In one embodiment, a first virtual object is displayed in the livestreaming page of the first livestreaming room, and the first virtual object is a game character, controlled by a livestreamer client of the first livestreaming room based on a first game account, in a game application. A second virtual object is displayed in the livestreaming page of the second livestreaming room, and the second virtual object is a game character, controlled by a livestreamer client of the second livestreaming room based on a second game account, in the game application. That the first livestreaming room matches the second livestreaming room refers to: a situation where the first virtual object and the second virtual object are in a same game battle in a game application.

In one embodiment, the game application includes at least two camps. That the first livestreaming room matches the second livestreaming room refers to a situation where the first virtual object and the second virtual object are in the same game battle in the game application. The first virtual object and the second virtual object are not in the same camp. The first game account belongs to the first game camp; the second game account belongs to the second game camp; and the first game camp and the second game camp are different. Since the first virtual object and the second virtual object are not in the same camp and are in a battle relationship, pairing the first livestreaming room corresponding to the first virtual object with the second livestreaming room corresponding to the second virtual object is more conducive to promoting effective interactions between different livestreaming rooms.

In another implementation, the game data associated with the first livestreaming room includes the game application associated with the first livestreaming room and a first game account used by the livestreamer client of the first livestreaming room in the game application, and the game data associated with the second livestreaming room includes the game application associated with the second livestreaming room and a second game account used by the livestreamer client of the second livestreaming room in the game application. That the first livestreaming room matches the second livestreaming room includes: a situation that the first game account and the second game account are in an account list of the same game battle of the game application. In one embodiment, when the first livestreaming room is in a pairing mode, the livestreamer of the first livestreaming room cannot switch the first game account used in the game application.

S306. Display an identifier of the second livestreaming room and attribute information of the second livestreaming room in the pairing mode.

The attribute information of the second livestreaming room includes at least one of the following: the identifier of the second livestreaming room and a livestreamer identifier of the second livestreaming room. In one embodiment, the terminal device of the livestreamer of the first livestreaming room displays a room number of the second livestreaming room and a nickname of the livestreamer of the second livestreaming room in the pairing mode, so that the livestreamer of the first livestreaming room can learn about the relevant information of the paired second livestreaming room.

S307. Display a support information bar.

The support information bar includes support data of the first livestreaming room and support data of the second livestreaming room. The support data of the first livestreaming room is obtained by counting support actions (such as giving virtual resources, giving likes, and sending bullet screens) of audiences of the first livestreaming room within a target period of time (such as during the pairing between the first livestreaming room and the second livestreaming room), and the support data of the second livestreaming room is obtained by counting support actions of audiences of the second livestreaming room within the target period of time.

In one embodiment, the support data in the support information bar is updated in real time with the support actions of the audiences of the first livestreaming room and the second livestreaming room.

S308. Output, when the first livestreaming room and the second livestreaming room quit the pairing mode, a support comparison result between the first livestreaming room and the second livestreaming room according to the support data of the first livestreaming room and the support data of the second livestreaming room.

Quitting the pairing mode includes any of the following: the selected state of the automatic pairing entry in the first livestreaming room is relieved; for example, the livestreamer of the first livestreaming room turns off the automatic pairing function, the livestreamer of the first livestreaming room gets disconnected, and the like; and the selected state of the automatic pairing entry of the second livestreaming room is relieved; and the first virtual object and the second virtual object are not in the same game battle in the game application. For example, the game battle has ended, and the livestreamer of the first livestreaming room quits the game.

The support comparison result includes final support data of the livestreamer client of the first livestreaming room in the current pairing mode, and final support data of the second livestreaming room in the current pairing mode. In one embodiment, the support comparison result is used for indicating a livestreaming room that achieves a support victory in this pairing mode. For example, the support data includes a support value. Among the first livestreaming room and the second livestreaming room, the livestreaming room with a high support value is determined as the livestreaming room that achieves the support victory. In addition, the support comparison result can also be used for indicating that the first livestreaming room has quit the pairing mode.

In the embodiments of this application, a livestreaming page of a first livestreaming room is displayed, where a first virtual object is displayed in the livestreaming page of the first livestreaming room, and the first virtual object is a game character, controlled by a livestreamer client of the first livestreaming room based on a first game account, in a game application; a pairing prompt is output when there is a second livestreaming room that matches the first livestreaming room, where a second virtual object is displayed in a livestreaming page of the second livestreaming room; the second virtual object is a game character, controlled by a livestreamer client of the second livestreaming room based on a second game account, in the game application, and that the first livestreaming room matches the second livestreaming room includes a situation that the first virtual object and the second virtual object are in a same game battle in the game application; and information of the second livestreaming room is displayed in a pairing mode. It can be seen therefrom that in the embodiments of this application, when it is determined that the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

Figure 5:
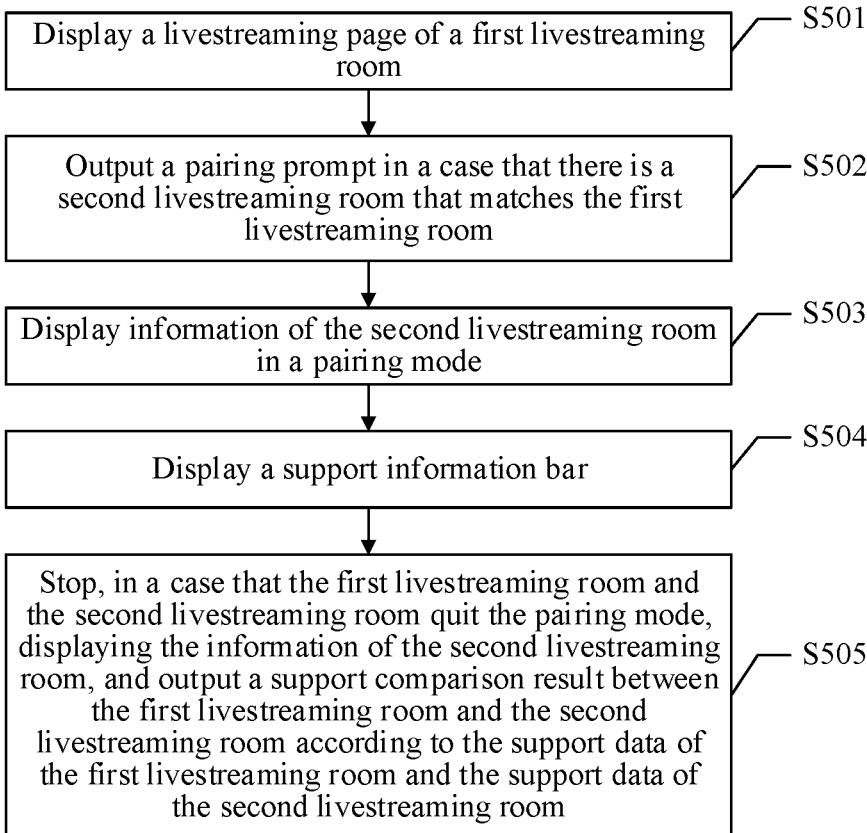
FIG. 5 shows a schematic flowchart of a further data matching method provided according to one embodiment of this application.

Based on the above data matching scenario, the embodiments of this application provide a data matching method. FIG. 5 shows a schematic flowchart of a further data matching method provided according to one embodiment of this application. In this embodiment, a data matching method can be performed by a computer device. The computer device may be terminal device 103 in the data matching scenario shown in FIG. 1. Referring to FIG. 5, the data matching method may include S501-S505 below:

S501. Display a livestreaming page of a first livestreaming room.

Figure 6A:
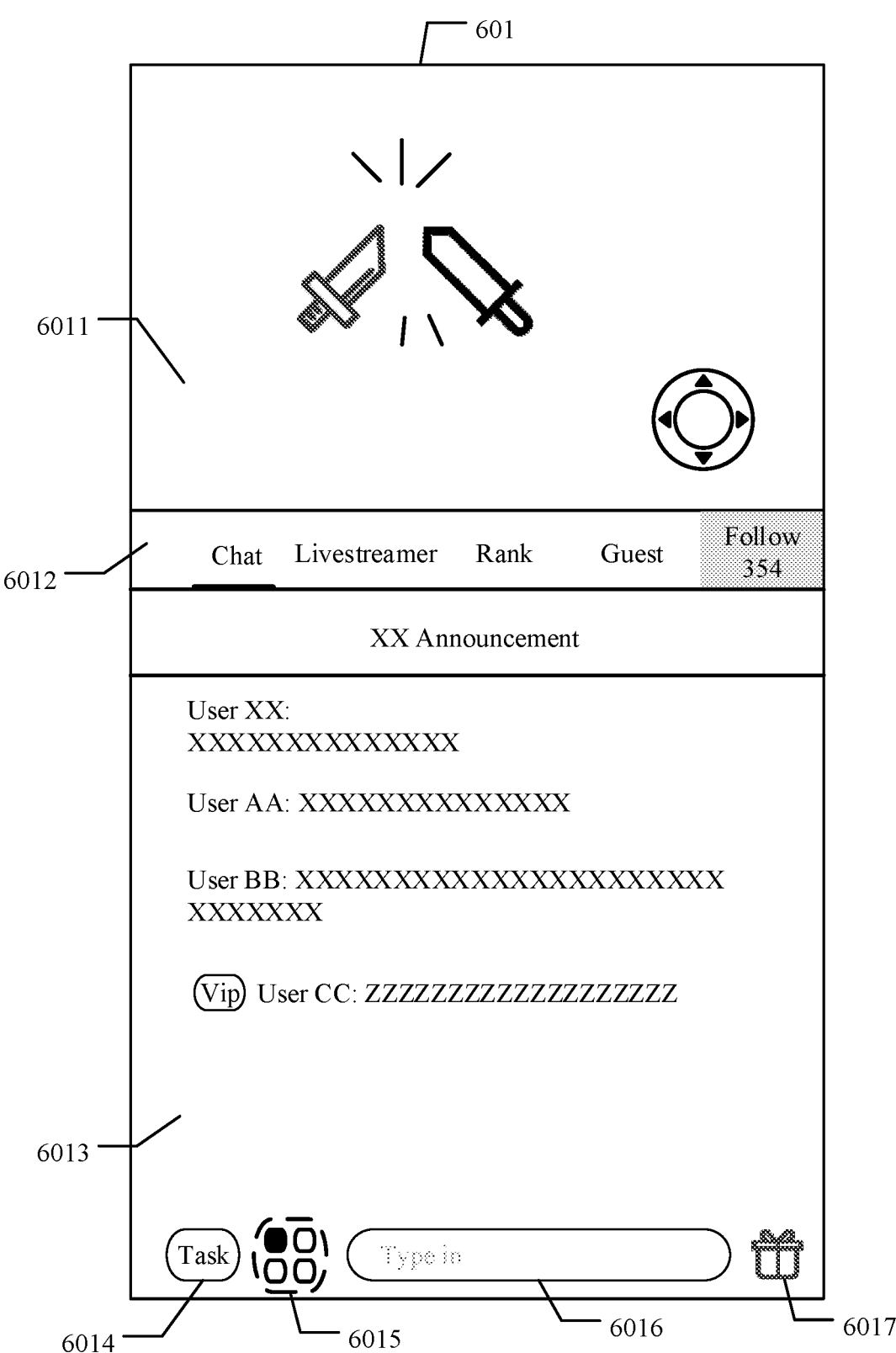
FIG. 6a shows a schematic diagram of a livestreaming page of a first livestreaming room provided according to another embodiment of this application.

FIG. 6a shows a schematic diagram of a livestreaming page of a first livestreaming room provided according to another embodiment of this application. As shown in FIG. 6a, the livestreaming page 601 of the first livestreaming room includes a picture data display region 6011, the picture data display region 6011 being used for displaying picture data of the first livestreaming room in real time, where when the picture data display region 6011 is triggered, the picture data of the first livestreaming room is displayed in a full-screen mode in the livestreaming page 601 of the first livestreaming room; a livestreaming information bar 6012, the livestreaming information bar 6012 being used for viewing a bullet screen, livestreamer information, audience information and the like of the first livestreaming room; a bullet screen display region 6013, the bullet screen display region 6013 being used for displaying a bullet screen of the first livestreaming room; a platform information viewing button 6014, the platform information viewing button 6014 being used for viewing platform information, such as a platform task; a virtual resource viewing button 6015, the virtual resource viewing button 6015 being used for viewing currently owned virtual resources; a bullet screen inputting bar 6016, the bullet screen inputting bar 6016 is used for transmitting a bullet screen; and a virtual resource transfer button 6017, the virtual resource transfer button 6017 being used for transferring a virtual resource to the current livestreaming room. In addition, the livestreaming page 601 of the first livestreaming room may further include an announcement bar, the announcement bar being used for displaying an announcement of a livestreaming platform, and an advertisement window, the advertisement window being used for displaying advertisement information of a livestreaming platform.

S502. Output a pairing prompt when there is a second livestreaming room that matches the first livestreaming room.

The pairing prompt is used for prompting the first livestreaming room and the second livestreaming room enter a pairing mode. The outputting the pairing prompt may specifically include displaying pairing prompt information and displaying an animation related to the pairing prompt. The pairing prompt can also be output by voice or vibration, which is not limited in this application. In one embodiment, the pairing mode means that the first livestreaming room and the second livestreaming room are connected for PK.

In one embodiment, a first virtual object is displayed in the livestreaming page of the first livestreaming room, and the first virtual object is a game character, controlled by a livestreamer client of the first livestreaming room based on a first game account, in a game application. A second virtual object is displayed in the livestreaming page of the second livestreaming room, and the second virtual object is a game character, controlled by a livestreamer client of the second livestreaming room based on a second game account, in the game application. That the first livestreaming room matches the second livestreaming room refers to: a situation where the first virtual object and the second virtual object are in a same game battle in a game application.

The game application includes at least two camps. That the first livestreaming room matches the second livestreaming room refers to: a situation where the first virtual object and the second virtual object are in the same game battle in the game application. The first virtual object and the second virtual object are not in the same camp.

In another implementation, the game data associated with the first livestreaming room includes the game application associated with the first livestreaming room and a first game account used by the livestreamer client of the first livestreaming room in the game application, and the game data associated with the second livestreaming room includes the game application associated with the second livestreaming room and a second game account used by the livestreamer client of the second livestreaming room in the game application. That the first livestreaming room matches the second livestreaming room includes: a situation that the first game account and the second game account are in an account list of the same game battle of the game application. In one embodiment, when the first livestreaming room is in a pairing mode, the livestreamer of the first livestreaming room cannot switch the first game account used in the game application.

Figure 6B:
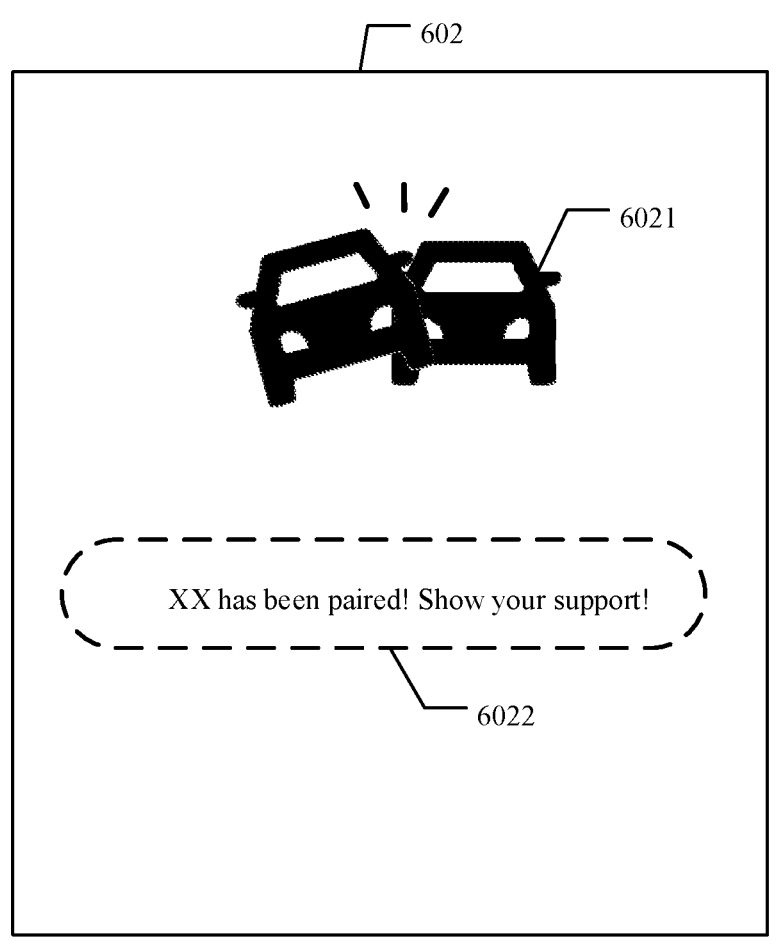
FIG. 6b shows a schematic diagram of a pairing prompt page provided according to one embodiment of this application.

FIG. 6*b* shows a schematic diagram of a pairing prompt page provided according to one embodiment of this application. As shown in FIG. 6*b*, the pairing prompt page 602 may include a pairing prompt identifier 6021 and pairing prompt information 6022. The pairing prompt information may be, for example, "xx has been paired!! Show your support!".

S503. Display information of the second livestreaming room in a pairing mode.

In one embodiment, the information of the second livestreaming room is an entry of the second livestreaming room, and a terminal device displays the entry of the second livestreaming room in the first livestreaming room in the pairing mode. The entry of the second livestreaming room carries an identifier of the second livestreaming room, for example, a title of the second livestreaming room, a nickname of the livestreamer of the second livestreaming room, and the like.

In another implementation, the information of the second livestreaming room is a livestreaming page of the second livestreaming room. The terminal displays the livestreaming page of the first livestreaming room and the livestreaming page of the second livestreaming room in the same interface of an audience client. In one embodiment, the interface of the audience client includes a main interface and a slave interface. The livestreaming page of the first livestreaming room is displayed in the main interface, and the livestreaming page of the second livestreaming room is displayed in the slave interface. If there is a switching operation in the interface, in response to the switching operation performed on the interface, the livestreaming page of the second livestreaming room is switched to the main interface for displaying, and the livestreaming page of the first livestreaming room is switched to the slave interface for displaying. The switching operation may be that, for example, an audience slides the livestreaming page of the first livestreaming room to the slave interface, or an audience slides the livestreaming page of the second livestreaming room to the main interface. If there is a full-screen triggering operation in the main interface, the slave interface is closed in response to the full-screen triggering operation performed on the interface, and a livestreaming page of a livestreaming room in the main interface is displayed in the interface in a full-screen mode, where the livestreaming page of the livestreaming room in the main interface being the livestreaming page of the first livestreaming room or the livestreaming page of the second livestreaming room. The full-screen triggering operation may be that, for example, an audience double clicks the livestreaming page of the first livestreaming room.

Figure 6C:
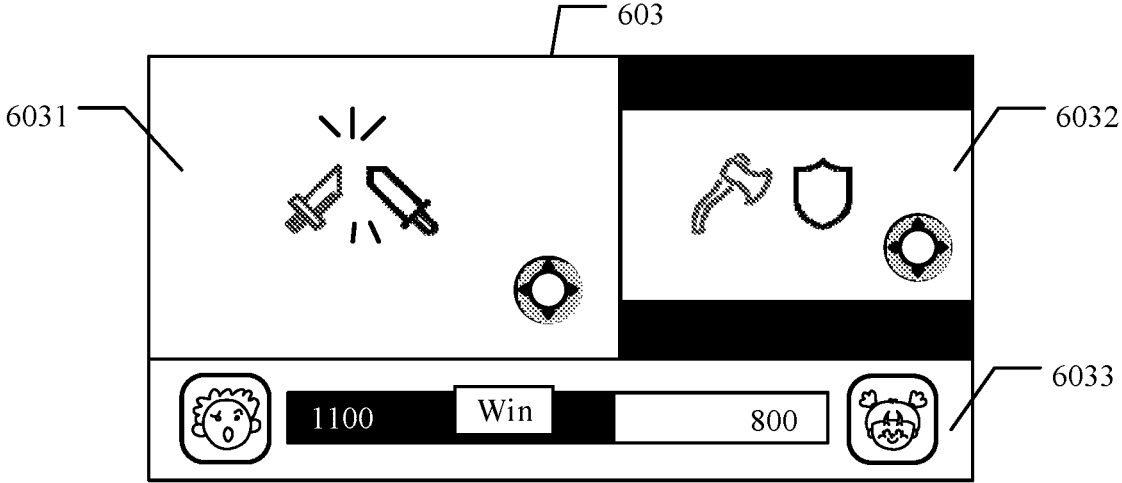
FIG. 6c shows a schematic diagram of an interface of an audience client provided according to another embodiment of this application.

FIG. 6*c* shows a schematic diagram of an interface of an audience client provided according to another embodiment of this application. As shown in FIG. 6*c*, the interface 603 includes a main interface 6031, a slave interface 6032 and a support information bar 6033. The support information bar 6033 is used for displaying support data of the first livestreaming room and support data of the second livestreaming room.

When the information of the second livestreaming room is triggered, a skip is made to the second livestreaming room. The livestreaming page of the second livestreaming room is displayed in the second livestreaming room. A triggering method can be that an audience clicks the entry of the second livestreaming room, or double clicks the livestreaming page of the second livestreaming room displayed in the interface of the audience client.

S504. Display a support information bar.

S505. Stop, when the first livestreaming room and the second livestreaming room quit the pairing mode, displaying the information of the second livestreaming room, and output a support comparison result between the first livestreaming room and the second livestreaming room according to the support data of the first livestreaming room and the support data of the second livestreaming room.

Specific implementations of S504 and S505 can refer to the implementations of S307 and S308 in FIG. 3, which will not be described in detail here.

In the embodiments of this application, a livestreaming page of a first livestreaming room is displayed, where a first virtual object is displayed in the livestreaming page of the first livestreaming room, and the first virtual object is a game character, controlled by a livestreamer client of the first livestreaming room based on a first game account, in a game application; a pairing prompt is output when there is a second livestreaming room that matches the first livestreaming room, where a second virtual object is displayed in a livestreaming page of the second livestreaming room; the second virtual object is a game character, controlled by a livestreamer client of the second livestreaming room based on a second game account, in the game application, and that the first livestreaming room matches the second livestreaming room includes a situation that the first virtual object and the second virtual object are in a same game battle in the game application; and information of the second livestreaming room is displayed in a pairing mode. It can be seen therefrom that in the embodiments of this application, when it is determined that the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

Based on the above data matching scenario, the embodiments of this application provide a data matching method. FIG. 7 shows a flow diagram of a still another data matching method provided according to one embodiment of this application. In this embodiment, the data matching method can be performed by a computer device. The computer device may be server 104 in the data matching scenario shown in FIG. 1. Referring to FIG. 7, the data matching method may include S701-S707 below:

S701. Obtain game data associated with the first livestreaming room in a livestreaming platform.

The game data associated with the first livestreaming room includes a game application associated with the first livestreaming room, and a first game account used by a livestreamer client of the first livestreaming room in the game application. A first virtual object is displayed in a livestreaming page of the first livestreaming room, and the first virtual object is a game character, controlled by a livestreamer client of the first livestreaming room based on a first game account, in a game application.

In one embodiment, the game data associated with the first livestreaming room may be game data that is configured by a livestreamer of the first livestreaming room, is obtained by the server, and is associated with the first livestreaming room configured by the livestreamer client of the first livestreaming room.

In another implementation, the server obtains current picture data of the livestreaming page of the first livestreaming room, and recognizes the current picture data to obtain the game data associated with the first livestreaming room. For example, the server can extract, by means of an image recognition technology, a first game account used by the livestreamer of the first livestreaming room during livestreaming and an identifier of the game application from real-time picture data of the first livestreaming room in the livestreaming process.

S702. Pair the first livestreaming room with the second livestreaming room in case there is a second livestreaming room that matches the first livestreaming room in the livestreaming platform.

A second virtual object is displayed in a livestreaming page of the second livestreaming room. The second virtual object is a game character, controlled by a livestreamer client of the second livestreaming room based on the second game account, in the game application. That the first livestreaming room matches the second livestreaming room includes: a situation where the first virtual object and the second virtual object are in a same game battle in a game application.

In one embodiment, the game data associated with the first livestreaming room includes a game application associated with the first livestreaming room and a first game account used by the livestreamer client of the first livestreaming room in the game application. A specific method used by the server to determine whether there is a second livestreaming room with associated game data matching the game data associated with the first livestreaming room in the livestreaming platform is as follows: screening out a candidate livestreaming room set associated with the game application from the livestreaming platform, the candidate livestreaming room set containing at least one candidate livestreaming room, and each candidate livestreaming room being associated with the game application; determining, according to the first game account, a game battle in which the first game account joins; obtaining a game account set joining in the game battle, the game account set containing the first game account; obtaining a game account used by a livestreamer client of each candidate livestreaming room in the game application; and when game accounts used by livestreamer clients of target candidate livestreaming rooms in the candidate livestreaming room set belong to the game account set, determining, according to the target candidate livestreaming rooms, a second livestreaming room that matches the first livestreaming room.

In one embodiment, the number of the target candidate livestreaming rooms is N which is an integer greater than 1. A method used by the server to determine the second livestreaming room that matches the first livestreaming room may be: obtaining priorities of the N target candidate livestreaming rooms, and determining that a target candidate livestreaming room with the highest priority among the N target candidate livestreaming rooms is the second livestreaming room. Any one of the N target candidate livestreaming rooms is denoted as an $i^{th}$ target candidate livestreaming room, and i is a positive integer less than or equal to N. The priority of the $i^{th}$ target candidate livestreaming room is determined according to at least one of the following: a difference value between an attention of the $i^{th}$ target candidate livestreaming room and an attention of the first livestreaming room, and a duration in which an automatic pairing entry of the $i^{th}$ target candidate livestreaming room is in a selected state. The priority of the $i^{th}$ target candidate livestreaming room is higher when the difference value is smaller; and the priority of the $i^{th}$ target candidate livestreaming room is higher when the duration is longer. The attention may specifically refer to a popularity value, the number of current audiences in a livestreaming room, and the like.

In another embodiment, if an automatic pairing entry of a target candidate livestreaming room is in an unselected state, for example, if automatic pairing of the target candidate livestreaming room is not turned on, the server sends state prompt information to a terminal device corresponding to the target candidate livestreaming room. The state prompt information is used for prompting the automatic pairing entry of the target candidate livestreaming room to be configured to a selected state, namely, prompting a livestreamer of the target candidate livestreaming room to turn on automatic pairing, to improve the attention of the target candidate livestreaming room. When the automatic pairing entry of the target candidate livestreaming room is configured to the selected state, the target candidate livestreaming room is determined as the second livestreaming room that matches the first livestreaming room.

In another implementation, the game data of the first livestreaming room includes a game application associated with the first livestreaming room and a first game account used by the livestreamer client of the first livestreaming room in the game application. A method used by the server to determine whether there is a second livestreaming room with game data matching the game data of the first livestreaming room in the livestreaming platform may be: determining, according to a game account used in each livestreaming room in the livestreaming platform, a game battle in which the livestreaming room joins; detecting, from among the livestreaming rooms except for the first livestreaming room, whether there is a game battle in which a target livestreaming room joins being the same as a game battle in which the first livestreaming room joins; and if there is such a game battle, determining the target livestreaming room as the second livestreaming room that matches the first livestreaming room.

In yet another implementation, the server obtains picture data of the first livestreaming room and picture data of the second livestreaming room. That the first livestreaming room matches the second livestreaming room means that: the picture data of the first livestreaming room matches the picture data of the second livestreaming room. For example, a game character of the livestreamer of the first livestreaming room during the livestreaming and an identifier of the game character are extracted based on the picture data of the first livestreaming room. If the game character of the livestreamer of the first livestreaming room during the livestreaming and the identifier of the game character are recognized from the picture data of the second livestreaming room, it is determined that the first livestreaming room matches the second livestreaming room.

In one embodiment, the game battle includes at least two camps. The server obtains a first game camp to which the first game account belongs, and a second game camp to which the second game account belongs; and pairs the first livestreaming room with the second livestreaming room when the first game camp and the second game camp are different.

S703. Transmit a pairing prompt to the client of the first livestreaming room.

The pairing prompt is used for prompting the first livestreaming room and the second livestreaming room enter a pairing mode. After receiving the pairing prompt, the client of the first livestreaming room may output the pairing prompt in the form of prompt information, a prompt window, a prompt voice, vibration, a prompt page, or the like, which is not limited in this application.

S704. Transmit information of the second livestreaming room to the first livestreaming room.

The server transmits the information of the second livestreaming room to the first livestreaming room, so that the client of the first livestreaming room displays the information of the second livestreaming room in the pairing mode. In one embodiment, the client of the first livestreaming room may refer to the livestreamer client of the first livestreaming room, and the information of the second livestreaming room includes attribute information of the second livestreaming room. In another implementation, the client of the first livestreaming room may refer to the audience client of the first livestreaming room, and the information of the second livestreaming room may include an entry of the second livestreaming room, a livestreaming page of the second livestreaming room, and an identifier of the second livestreaming room.

S705. Count support data of the first livestreaming room and support data of the second livestreaming room within a target period.

The support data of the first livestreaming room is obtained by counting support actions of audiences of the first livestreaming room within the target period of time. For example, the support data of the first livestreaming room is obtained by counting the support actions of the audiences of the first livestreaming room during the pairing between the first livestreaming room and the second livestreaming room. The support actions include giving virtual resources and giving likes. The support data of the second livestreaming room is obtained by counting support actions of audiences of the second livestreaming room within the target period of time.

S706. Determine a support comparison result according to the support data of the first livestreaming room and the support data of the second livestreaming room.

The support comparison result includes final support data of the first livestreaming room in the current pairing mode, and final support data of the second livestreaming room in the current pairing mode. In one embodiment, the support comparison result is used for indicating a livestreaming room that achieves a support victory in this pairing mode. For example, the support data includes a support value. Among the first livestreaming room and the second livestreaming room, the livestreaming room with a high support value is determined as the livestreaming room that achieves the support victory.

S707. Transmit support feedback to an audience client of the first livestreaming room or the second livestreaming room according to the support comparison result.

Figure 8:
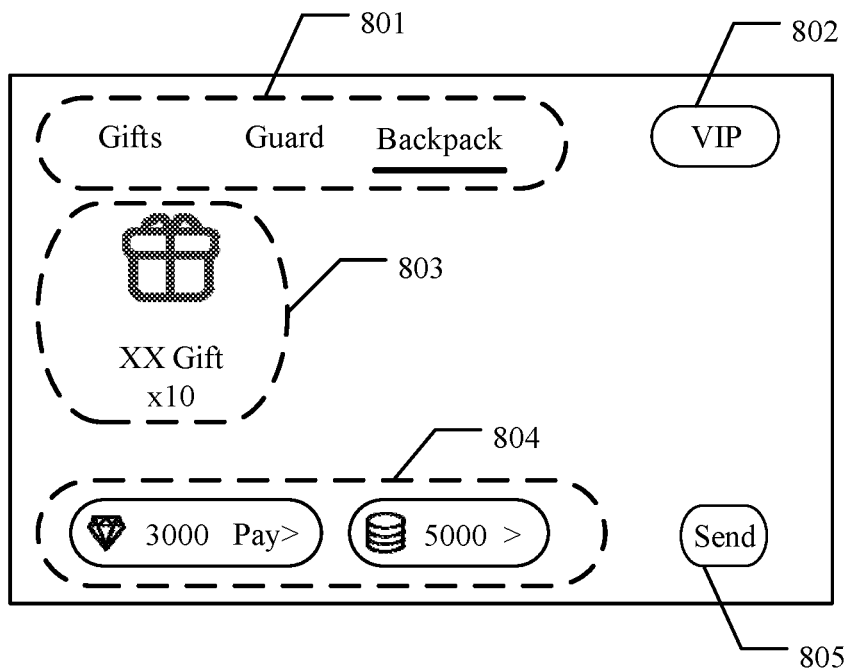
FIG. 8 shows a schematic diagram of a virtual resource viewing window provided according to one embodiment of this application.

The support feedback can be used for indicating whether the livestreaming room supported by the audiences wins. In one embodiment, the support feedback carries a support reward. The support reward may be specifically a virtual resource or a virtual good. The audience client that earned the support reward may display a notification message to notify the audience that the support reward is earned. The audience can view currently owned virtual resources by opening a virtual resource viewing window through the virtual resource viewing button 6015 in FIG. 6a. FIG. 8 shows a schematic diagram of a virtual resource viewing window provided according to one embodiment of this application. As shown in FIG. 8, the virtual resource viewing window includes an option bar 801, the option bar 801 being used for viewing different types of virtual goods, such as gifts, guards and backpacks; a membership opening entry 802, for example, a "VIP" button in FIG. 8, the membership opening entry 802 being used for entering a membership opening page; a virtual good display region 803, the virtual goods display region 803 being used for displaying currently owned virtual goods of the audience; a virtual resource display region 804, the virtual resource display region 804 being used for displaying currently owned virtual resources of the audience; and a virtual resource transfer button 805, the virtual resource transfer button 805 being used for transferring a virtual resource.

In one embodiment, a winning award, which may be, in particular, a virtual resource or virtual goods, is transmitted to the livestreamer client of the livestreaming room that has earned the support victory.

Figure 9:
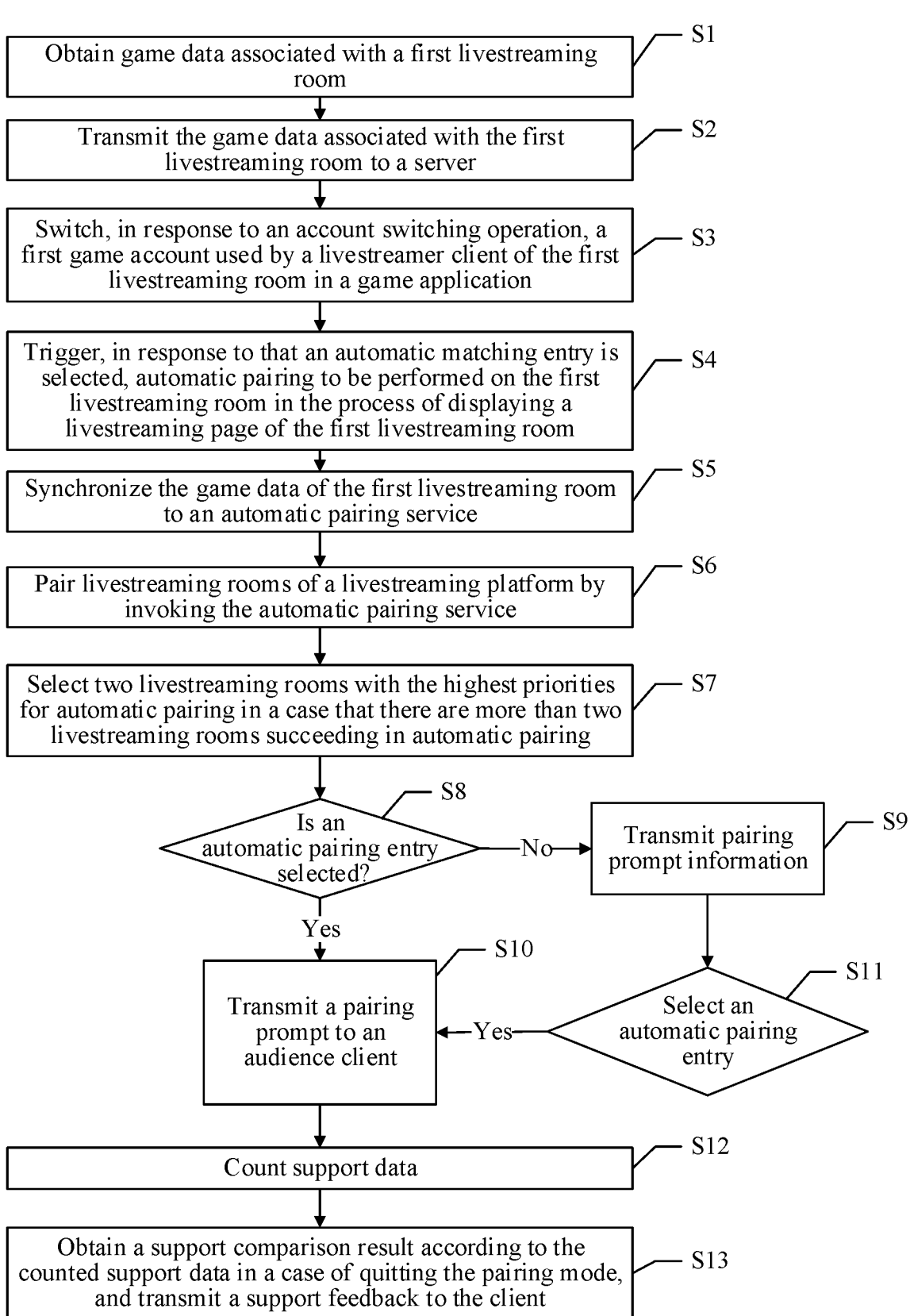
FIG. 9 shows a schematic flowchart of data matching provided according to one embodiment of this application.

FIG. 9 shows a flow diagram of data matching provided according to one embodiment of this application. As shown in FIG. 9, matching of game livestreaming rooms is taken as an example. A data matching method of this application is as follows:

S1. Obtain game data associated with a first livestreaming room.

The game data associated with the first livestreaming room is obtained by using a configuration page. The game data associated with the first livestreaming room is configured by a livestreamer of the first livestreaming room on the configuration page. The game data of the first livestreaming room includes a game application associated with the first livestreaming room, and one or more game accounts bound to a livestreamer client of the first livestreaming room in the game application.

S2. Transmit the game data associated with the first livestreaming room to a server.

The livestreamer client transmits the game data associated with the first livestreaming room to the server (such as a service background), and the server stores an identifier of the first livestreaming room and the one or more game accounts bound in the associated game application in the form of a key-value pair. The identifier of the first livestreaming room is a key, and the one or more game accounts bound in the associated game application are stored values, to facilitate subsequent query on the game accounts bound to the first livestreaming room.

S3. Switch, in response to an account switching operation, a first game account used by the livestreamer client of the first livestreaming room in the game application.

The first game account that is configured by a livestreamer of the first livestreaming room and is used by the livestreamer client of the first livestreaming room in the game application needs to be kept consistent with a game account that is currently used by the livestreamer of the first livestreaming room.

S4. Trigger, in response to that an automatic matching entry is selected, automatic pairing to be performed on the first livestreaming room in the process of displaying a livestreaming page of the first livestreaming room; and skip the automatic matching of the first livestreaming room in response to the automatic matching entry is not selected.

S5. Synchronize the game data of the first livestreaming room to an automatic pairing service.

The server synchronizes the game data associated with the first livestreaming room to the automatic pairing service, and the synchronized game data may include the identifier of the game application, such as appid, and a character identifier of the first game account, such as id or user_id.

S6. Pair livestreaming rooms of a livestreaming platform by invoking the automatic pairing service.

All livestreaming rooms configured with game accounts of game applications in the livestreaming platform are classified according to the appid of the game application by invoking the automatic pairing service. Each game application corresponds to one key, and maintains a game character id list list_appid of one livestreaming room. The server runs a plurality of threads in parallel, invokes an information interface of a game battle id for each game character id in list_appid, and queries game battle information of a game account character user_id. The game battle information may return a character id list contained in a current game battle. If two or more character ids of the character id list contained in the current game battle exist in list_appid, there are at least two livestreaming rooms which succeed in automatic pairing.

S7. Select two livestreaming rooms for automatic pairing according to the following priority determining rule when there are more than two livestreaming rooms succeeding in automatic pairing.

(1) Livestreaming rooms with their automatic pairing entries preferentially selected among the livestreaming rooms succeeding in automatic pairing are automatically paired. (2) Two livestreaming rooms with close current popularity values among the livestreaming rooms succeeding in automatic pairing are automatically paired.

S8. Determine whether an automatic pairing entry is selected; perform S9 if no; and perform S10 if yes.

S9. Transmit pairing prompt information to the livestreaming room.

The pairing prompt information is used for prompting the livestreamer of the livestreaming room to set the automatic pairing entry to be a selected state, so that a user can support the livestreaming room.

S10. Transmit a pairing prompt to an audience client.

In S8, if it is determined that the automatic pairing entries of two paired livestreaming rooms are selected, the pairing prompt is issued to all audience clients of the two paired livestreaming rooms via a long link of websocket (which is a protocol for performing full-duplex communication on a single TCP link). After receiving the pairing prompt, the audience clients display information of the livestreaming rooms, for example, display picture data of the livestreaming rooms, entries of the livestreaming rooms, and the like.

S11. Select an automatic pairing entry.

In S9, for livestreaming rooms with unselected automatic pairing entries, if livestreamers select the automatic pairing entries after receiving the pairing prompt information, S10 is performed.

S12. Count support data.

In the pairing mode, audiences can support the livestreamers by supporting actions, for example, giving virtual goods, sending bullet screens and the like. The server may count the support data of the paired livestreaming rooms, and issue the support data of the livestreaming rooms to the audience clients of the paired livestreaming rooms in real time, to show the support data to the audiences in real time.

S13. Obtain a support comparison result according to the counted support data in case of quitting the pairing mode, and transmit support feedback to the clients.

The server periodically queries situations of the game battle of the paired livestreaming rooms in real time. If the current game battle has ended, the server performs support comparison, and synchronizes the support comparison result to the audience clients and the livestreamer clients of the paired livestreaming rooms in real time, to display the support comparison result to the various clients. Meanwhile, for livestreaming rooms with a support victory, the server may transmit the support feedback to the audience clients joining in the support. For example, the support feedback may be a virtual good, a virtual resource, and the like.

In the embodiments of this application, a livestreaming page of a first livestreaming room is displayed, where a first virtual object is displayed in the livestreaming page of the first livestreaming room, and the first virtual object is a game character, controlled by a livestreamer client of the first livestreaming room based on a first game account, in a game application; a pairing prompt is output when there is a second livestreaming room that matches the first livestreaming room, where a second virtual object is displayed in a livestreaming page of the second livestreaming room; the second virtual object is a game character, controlled by a livestreamer client of the second livestreaming room based on a second game account, in the game application, and that the first livestreaming room matches the second livestreaming room includes a situation that the first virtual object and the second virtual object are in a same game battle in the game application; and information of the second livestreaming room is displayed in a pairing mode. It can be seen therefrom that in the embodiments of this application, when it is determined that the game character of the first livestreaming room and the game character of the second livestreaming room are in the same game battle of the same game application, automatic pairing can be performed between the first livestreaming room and the second livestreaming room, and this automatic pairing method not only has higher matching efficiency, but also enriches interactions of a livestreaming platform, so that different livestreaming rooms can also interact with each other effectively, thereby improving the interaction capability of the livestreaming platform.

This application may be further combined to provide further implementations based on the implementations provided by the above-mentioned aspects.

The foregoing content describes in detail the methods of the embodiments of this application. To better implement the foregoing solutions in the embodiments of this application, the embodiments of this application correspondingly provide apparatuses.

Figure 10:
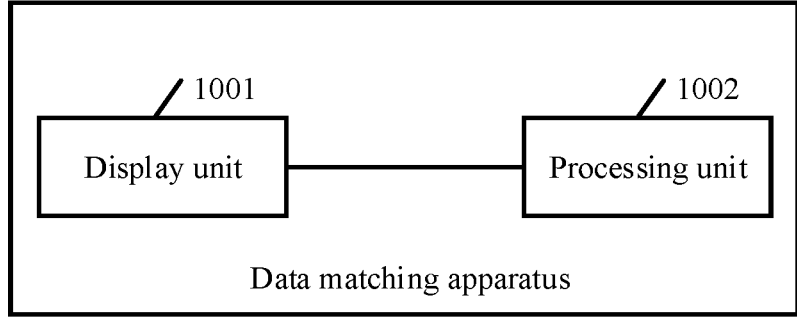
FIG. 10 shows a schematic structural diagram of a data matching apparatus provided according to one embodiment of this application.

Referring to FIG. 10, FIG. 10 shows a schematic structural diagram of a data matching apparatus provided according to one embodiment of this application. The apparatus can be implemented on terminal device 101 or the terminal device 103 shown in FIG. 1. The data matching apparatus shown in FIG. 10 may be used to perform some or all of the functions of the method embodiments described above with respect to FIG. 2, FIG. 3 and FIG. 5. Referring to FIG. 10, detailed descriptions of the various units are as follows:

A display unit 1001 is configured to: display a livestreaming page of a first livestreaming room, a first virtual object being displayed in the livestreaming page of the first livestreaming room, and the first virtual object being a game character, controlled by a livestreamer client of the first livestreaming room based on a first game account, in a game application;

output a pairing prompt when there is a second livestreaming room that matches the first livestreaming room, the pairing prompt being used for prompting that the first livestreaming room and the second livestreaming room enter a pairing mode; a second virtual object being displayed in a livestreaming page of the second livestreaming room, the second virtual object being a game character, controlled by a livestreamer client of the second livestreaming room based on a second game account, in the game application, and that the first livestreaming room matches the second livestreaming room including a situation that the first virtual object and the second virtual object are in a same game battle in the game application; and display information of the second livestreaming room in the pairing mode.

In one embodiment, the method is applied to a livestreamer client of the first livestreaming room, and the data matching apparatus further includes a processing unit 1002. The display unit 1001 is further configured to:

display a configuration page of the first livestreaming room, the configuration page including configuration options.

The processing unit 1002 is configured to configure, based on the configuration options, game data associated with the first livestreaming room, the game data including the game application associated with the first livestreaming room, and the first game account.

In one embodiment, the first livestreaming room is configured with an automatic pairing entry. When the automatic pairing entry is in a selected state, the first livestreaming room is automatically paired in the process of displaying the livestreaming page of the first livestreaming room.

In one embodiment, the automatic pairing entry is configured in a livestreaming management page of the first livestreaming room, or the automatic pairing entry is configured in the configuration page of the first livestreaming room.

In one embodiment, the display unit 1001 is further configured to:

display an automatic pairing confirmation page when the automatic pairing entry is selected. The first option and a second option are configured in the automatic pairing confirmation page. The first option is used for keeping the automatic pairing entry in the selected state, and the second option is used for relieving the selected state of the automatic pairing entry.

In one embodiment, the method is applied to the livestreamer client of the first livestreaming room. The display unit 1001 displays the information of the second livestreaming room in the pairing mode, which specifically includes:

displaying attribute information of the second livestreaming room in the pairing mode. The attribute information includes at least one of the following: an identifier of the second livestreaming room and a livestreamer identifier of the second livestreaming room.

In one embodiment, the method is applied to an audience client of the first livestreaming room. The display unit 1001 displays the information of the second livestreaming room in the pairing mode, which specifically includes:

displaying an entry of the second livestreaming room in the first livestreaming room in the pairing mode, the entry of the second livestreaming room carrying the identifier of the second livestreaming room.

In one embodiment, the method is applied to an audience client of the first livestreaming room. The display unit 1001 displays the information of the second livestreaming room in the pairing mode, which specifically includes:

synchronously displaying the livestreaming page of the first livestreaming room and the livestreaming page of the second livestreaming room in the same interface of the audience client.

In one embodiment, the interface includes a main interface and a slave interface. The livestreaming page of the first livestreaming room is displayed in the main interface, and the livestreaming page of the second livestreaming room is displayed in the slave interface. The display unit 1001 is further configured to:

in response to a switching operation performed on the interface, switch the livestreaming page of the second livestreaming room to the main interface for displaying, and switch the livestreaming page of the first livestreaming room to the slave interface for displaying; and close the slave interface in response to a full-screen triggering operation performed on the main interface, and display, in the interface in a full-screen mode, a livestreaming page of a livestreaming room in the main interface, the livestreaming page of the livestreaming room in the main interface being the livestreaming page of the first livestreaming room or the livestreaming page of the second livestreaming room.

In one embodiment, the display unit 1001 is further configured to:

stop displaying the information of the second livestreaming room when the first livestreaming room and the second livestreaming room quit the pairing mode.

Quitting the pairing mode includes any of the following: the selected state of the automatic pairing entry in the first livestreaming room is relieved; the selected state of the automatic pairing entry of the second livestreaming room is relieved; and the first virtual object and the second virtual object are not in the same game battle in the game application.

In one embodiment, the game battle includes at least two game camps; the first game account belongs to the first game camp; the second game account belongs to the second game camp; and the first game camp and the second game camp are different.

In one embodiment, the display unit 1001 is further configured to:

display a support information bar, the support information bar including support data of the first livestreaming room and support data of the second livestreaming room; and output, when the first livestreaming room and the second livestreaming room quit the pairing mode, a support comparison result between the first livestreaming room and the second livestreaming room according to the support data of the first livestreaming room and the support data of the second livestreaming room.

According to one embodiment of this application, some of the steps involved in the data matching methods shown in FIG. 2, FIG. 3 and FIG. 5 may be performed by various units of the data matching apparatus shown in FIG. 10. For example, S201-S203 shown in FIG. 2 may be executed by the display unit 1001 shown in FIG. 10. S301 and S303-S308 shown in FIG. 3 may be executed by the display unit 1001 shown in FIG. 10, and S302 may be executed by the processing unit 1002 shown in FIG. 10. S501-S505 shown in FIG. 5 may be executed by the display unit 1001 shown in FIG. 10. Various units in the data matching method shown in FIG. 10 can be respectively or all combined into one or several other units, or a certain unit (some units) thereof can also be divided into a plurality of functionally smaller units. This can achieve the same operation without affecting implementations of technical effects of the embodiments of this application. The above-mentioned units are divided based on logical functions. In some embodiments, the function of one unit may also be implemented by a plurality of units, or the functions of a plurality of units may be implemented by one unit. In other embodiments of this application, the data matching apparatus may also include other units. In some embodiments, these functions may also be implemented with other units, and may be cooperatively implemented by a plurality of units.

According to another embodiment of this application, computer programs (including program codes) capable of executing all the steps involved in the corresponding methods as shown in FIG. 2, FIG. 3 and FIG. 5 can be run in a general computing device, such as a computer, including a central processing unit (CPU), a random-access memory (RAM), a read-only memory (ROM) and other processing elements and memory elements, so as to construct the data matching apparatus as shown in FIG. 10, and to implement the data matching method of the embodiments of this application. The computer programs may be recorded, for example, on a computer-readable storage medium, loaded to the above-described computing apparatus through the computer-readable storage medium, and run in the computing apparatus.

Based on the same inventive concept, the principles and advantageous effects of the data matching apparatus provided in the embodiments of this application for solving problems are similar to the principles and advantageous effects of the data matching method provided in the embodiments of this application for solving problems, and reference can be made to the principles and advantageous effects of the implementation of the method, which will not be described in detail here for the sake of brevity.

Figure 11:
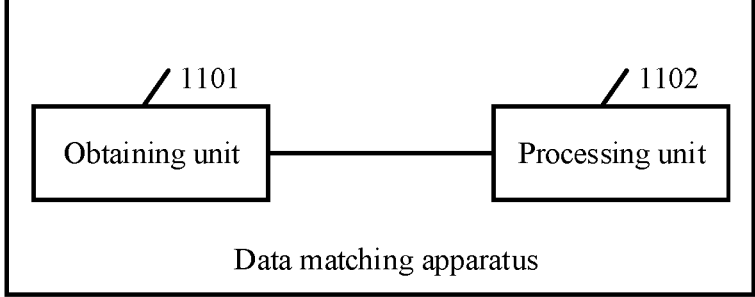
FIG. 11 shows a schematic structural diagram of another data matching apparatus provided according to one embodiment of this application.

Referring to FIG. 11, FIG. 11 shows a schematic structural diagram of another data matching apparatus provided according to one embodiment of this application. The apparatus can be implemented on server 104 shown in FIG. 1. The data matching apparatus shown in FIG. 11 may be configured to perform some or all of the functions of the method embodiment described above with respect to FIG. 7. Referring to FIG. 11, detailed descriptions of the various units are as follows:

An obtaining unit 1101 is configured to: obtain game data associated with a first livestreaming room in a livestreaming platform, the game data including a game application associated with the first livestreaming room and a first game account used by a livestreamer client of the first livestreaming room in the game application; and a first virtual object being displayed in a livestreaming page of the first livestreaming room, and the first virtual object being a game character, controlled by a livestreamer client of the first livestreaming room based on a first game account, in a game application.

A processing unit 1102 is configured to pair the first livestreaming room with the second livestreaming room when there is a second livestreaming room that matches the first livestreaming room in the livestreaming platform; a second virtual object being displayed in a livestreaming page of the second livestreaming room, the second virtual object being a game character, controlled by a livestreamer client of the second livestreaming room based on a second game account, in the game application, and that the first livestreaming room matches the second livestreaming room including a situation that the first virtual object and the second virtual object are in a same game battle in the game application;

configured to transmit a pairing prompt to the client of the first livestreaming room, the pairing prompt being used for prompting that the first livestreaming room and the second livestreaming room enter a pairing mode; and configured to transmit information of the second livestreaming room to the first livestreaming room, so that the client of the first livestreaming room displays the information of the second livestreaming room in the pairing mode.

In one embodiment, the obtaining unit 1101 obtains the game data associated with the first livestreaming room in the livestreaming platform, which specifically includes:

obtaining the game data configured by the livestreamer client of the first livestreaming room and associated with the first livestreaming room; or, obtaining current picture data of the livestreaming page of the first livestreaming room, and recognizing, from the current picture data, the game data associated with the first livestreaming room.

In one embodiment, the processing unit 1102 is further configured to:

screen out a candidate livestreaming room set from the livestreaming platform, the candidate livestreaming room set containing at least one candidate livestreaming room, and each candidate livestreaming room being associated with the game application;

determine, according to the first game account, a game battle in which the first game account joins;

obtain a game account set joining in the game battle, the game account set containing the first game account;

obtain a game account used by a livestreamer client of each candidate livestreaming room in the game application; and when game accounts used by livestreamer clients of target candidate livestreaming rooms in the candidate livestreaming room set belong to the game account set, determine, according to the target candidate livestreaming rooms, a second livestreaming room that matches the first livestreaming room.

In one embodiment, the number of the target candidate livestreaming rooms is N which is an integer greater than 1. The processing unit 1102 determines, according to the target candidate livestreaming rooms, the second livestreaming room that matches the first livestreaming room, which specifically includes:

obtaining priorities of the N target candidate livestreaming rooms; and determining that a target candidate livestreaming room with the highest priority among the N target candidate livestreaming rooms is the second livestreaming room.

In one embodiment, any one of the N target candidate livestreaming rooms is denoted as an $i^{th}$ target candidate livestreaming room, and i is a positive integer less than or equal to N. The priority of the $i^{th}$ target candidate livestreaming room is determined according to at least one of the following: a difference value between an attention of the $i^{th}$ target candidate livestreaming room and an attention of the first livestreaming room, and a duration in which an automatic pairing entry of the $i^{th}$ target candidate livestreaming room is in a selected state. The priority of the $i^{th}$ target candidate livestreaming room is higher when the difference value is smaller; and the priority of the $i^{th}$ target candidate livestreaming room is higher when the duration is longer.

In one embodiment, the processing unit 1102 is further configured to:

transmit state prompt information to the target candidate livestreaming rooms when automatic pairing entries of the target candidate livestreaming rooms are in unselected states, the state prompt information being used for prompting the automatic pairing entries of the target candidate livestreaming rooms to be configured to selected states.

In one embodiment, the processing unit 1102 is further configured to:

count support data of the first livestreaming room and support data of the second livestreaming room within a target period;

determine a support comparison result according to the support data of the first livestreaming room and the support data of the second livestreaming room; and transmit support feedback to an audience client of the first livestreaming room or the second livestreaming room according to the support comparison result.

In one embodiment, the game battle includes at least two game camps. The processing unit 1102 is further configured to:

obtain a first game camp to which the first game account belongs, and a second game camp to which the second game account belongs; and perform, when the first game camp and the second game camp are different, the step of pairing the first livestreaming room with the second livestreaming room.

According to one embodiment of this application, some of the steps involved in the data matching method shown in FIG. 7 may be performed by various units of the data matching apparatus shown in FIG. 11. For example, S701 shown in FIG. 7 may be executed by the obtaining unit 1101 shown in FIG. 11, and S702-S707 may be executed by the processing unit 1102 shown in FIG. 11. Various units in the data matching method shown in FIG. 11 can be respectively or all combined into one or several other units, or a certain unit (some units) thereof can also be divided into a plurality of functionally smaller units. This can achieve the same operation without affecting implementations of technical effects of the embodiments of this application. The above-mentioned units are divided based on logical functions. In some embodiments, the function of one unit may also be implemented by a plurality of units, or the functions of a plurality of units may be implemented by one unit. In other embodiments of this application, the data matching apparatus may also include other units. In some embodiments, these functions may also be implemented with other units.

According to another embodiment of this application, computer programs (including program codes) capable of executing all the steps involved in the corresponding method as shown in FIG. 7 can be run in a general computing device, such as a computer, including a central processing unit (CPU), a random-access memory (RAM), a read-only memory (ROM) and other processing elements and memory elements, so as to construct the data matching apparatus as shown in FIG. 11, and to implement the data matching method of the embodiments of this application. The computer programs may be recorded, for example, on a computer-readable storage medium, loaded to the above-described computing apparatus through the computer-readable storage medium, and run in the computing apparatus.

Based on the same inventive concept, the principles and advantageous effects of the data matching apparatus provided in the embodiments of this application for solving problems are similar to the principles and advantageous effects of the data matching method provided in the embodiments of this application for solving problems, and reference can be made to the principles and advantageous effects of the implementation of the method, which will not be described in detail here for the sake of brevity.

Figure 12:
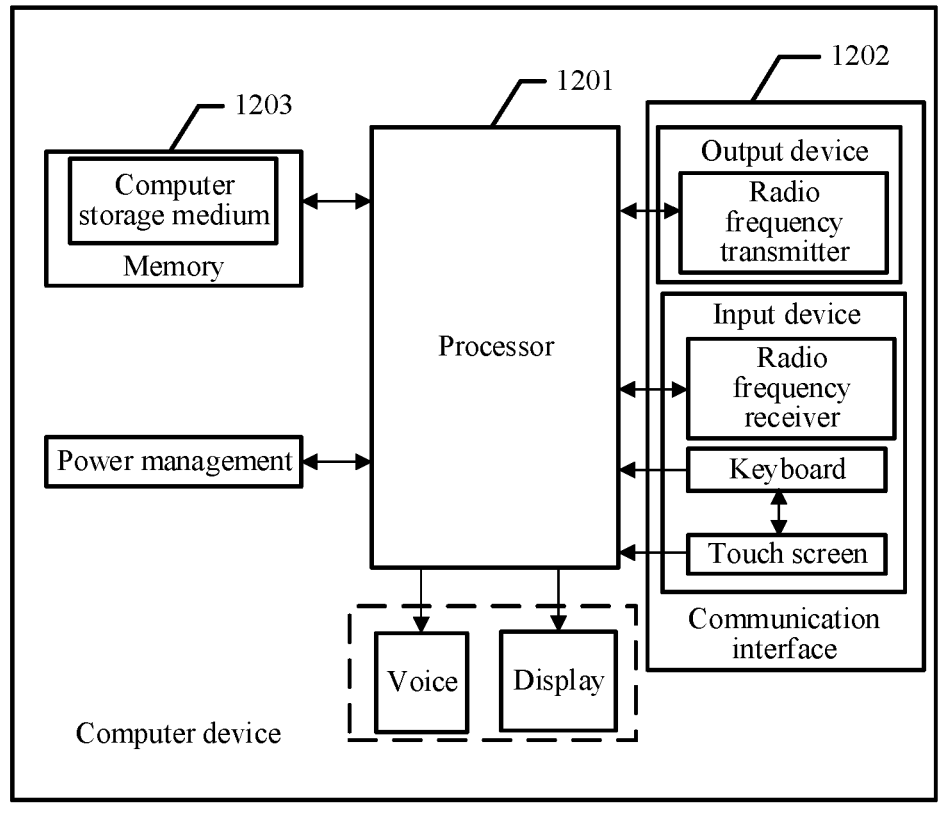
FIG. 12 shows a schematic structural diagram of a computer device according to one embodiment of this application.

Referring to FIG. 12, FIG. 12 shows a schematic structural diagram of a computer device according to one embodiment of this application. The computer device includes at least a processor 1201, a communication interface 1202 and a memory 1203. The processor 1201, the communication interface 1202 and the memory 1203 may be connected via a bus or in other means. In this embodiment, bus connection is taken as an example. The processor 1201 (or referred to as central processing unit (CPU)) is a computing core and control core of the computer device may parse various kinds of instructions in a terminal device all kinds of data of the terminal device. For example: the CPU may be configured to parse an on/off instruction transmitted by a user to the terminal device and control the terminal device to perform a switch on/off operation. As another example: the CPU may transmit all kinds of interaction data and the like between internal structures of the terminal device. The communication interface 1202 may include a standard wired interface and a standard wireless interface (such as Wi-Fi and mobile communication interfaces), and is controlled by the processor 1201 to be configured to transmit and receive data. The communication interface 1202 may also be used for transmission and interaction of data inside the terminal device. The memory 1203 is a storage device in the terminal device, and is configured to store programs and data. It is understood that memory 1203 here may include an internal memory of the terminal device, and may also certainly include an expanded memory supported by the terminal device. Memory 1203 provides a storage space which stores an operating system of the terminal device and may include but not limited to: an Android system, an iOS system, a Windows Phone system and the like, which is not limited in this application.

The embodiments of this application also provide a computer-readable storage medium (Memory) that is a memory device in an electronic device to store programs and data. It is understood that the computer-readable storage medium here can include both a built-in memory in a terminal and an extended memory supported by the terminal. The computer-readable storage medium provides a storage space that stores a processing system of the terminal. Furthermore, one or more instructions adapted to be loaded and executed by the processor 1201 are also stored in the storage space, and these instructions can be one or more computer programs (including program codes). The computer-readable storage medium herein may be either a high-speed RAM or a non-volatile memory, such as at least one disk memory. In some embodiments, there may be at least one computer-readable storage medium located away from the aforementioned processor.

In one embodiment, the computer device may be a terminal device, such as the terminal device 101 or the terminal device 103 shown in FIG. 1. In this case, the processor 1201 performs the following operations by running executable program codes in the memory 1203:

displaying a livestreaming page of a first livestreaming room, a first virtual object being displayed in the livestreaming page of the first livestreaming room, and the first virtual object being a game character, controlled by a livestreamer client of the first livestreaming room based on a first game account, in a game application;

outputting a pairing prompt when there is a second livestreaming room that matches the first livestreaming room, the pairing prompt being used for prompting that the first livestreaming room and the second livestreaming room enter a pairing mode; a second virtual object being displayed in a livestreaming page of the second livestreaming room, the second virtual object being a game character, controlled by a livestreamer client of the second livestreaming room based on a second game account, in the game application, and that the first livestreaming room matches the second livestreaming room including a situation that the first virtual object and the second virtual object are in a same game battle in the game application; and displaying information of the second livestreaming room in a pairing mode.

In another embodiment, the computer device may refer to a server, such as the server 104 shown in FIG. 1. The processor 1201 performs the following operations by running executable program codes in the memory 1203:

obtaining, by using the communication interface 1202, game data associated with a first livestreaming room in a livestreaming platform, the game data including a game application associated with the first livestreaming room and a first game account used by a livestreamer client of the first livestreaming room in the game application; a first virtual object being displayed in a livestreaming page of the first livestreaming room, and the first virtual object being a game character, controlled by a livestreamer client of the first livestreaming room based on a first game account, in a game application;

pairing the first livestreaming room with the second livestreaming room when there is a second livestreaming room that matches the first livestreaming room in the livestreaming platform; a second virtual object being displayed in a livestreaming page of the second livestreaming room, the second virtual object being a game character, controlled by a livestreamer client of the second livestreaming room based on a second game account, in the game application, and that the first livestreaming room matches the second livestreaming room including a situation that the first virtual object and the second virtual object are in a same game battle in the game application;

transmitting a pairing prompt to the client of the first livestreaming room, the pairing prompt being used for prompting that the first livestreaming room and the second livestreaming room enter a pairing mode; and transmitting information of the second livestreaming room to the first livestreaming room, so that the client of the first livestreaming room displays the information of the second livestreaming room in the pairing mode.

Based on the same inventive concept, the principles and advantageous effects of the data matching apparatus provided in the embodiments of this application for solving problems are similar to the principles and advantageous effects of the data matching method provided in the embodiments of this application for solving problems, and reference can be made to the principles and advantageous effects of the implementation of the method, which will not be described in detail here for the sake of brevity.

The embodiments of this application also provide a computer-readable storage medium storing one or more instructions, the one or more instructions being adapted to be loaded by a processor and to perform the data matching methods of the above method embodiments.

The embodiments of this application further provide a computer program product or a computer program, the computer program product or the computer program including computer instructions stored in a computer-readable storage medium. A processor of a computer device reads the computer instructions from the computer-readable storage medium and executes the computer instructions, causing the computer device to implement the above data matching method.

The steps in the methods of the embodiments of this application can be sequentially adjusted, combined and deleted according to requirements.

The modules in the apparatuses of the embodiments of this application can be combined, divided and deleted according to requirements.

It is understood by those of ordinary skill in the art that all or part of the steps in the various methods of the above embodiments may be implemented by instructing relevant hardware by programs. The programs may be stored in a computer-readable storage medium. The readable storage medium may include: a flash disk, a Read-Only Memory (ROM), a Random Access Memory (RAM), a magnetic disk, an optical disc or the like.

The above is only a preferred embodiment of this application, and is not intended to limit the scope of claims of this application. Those of ordinary skilled in the art may understand all or part of the processes for implementing the above embodiments, and equivalent changes made in accordance with the claims of this application still fall within the scope of this application.

What is claimed is:

1. A data matching method, the method being performed by a computer device and comprising:

displaying a livestreaming page of a first livestreaming room on a livestreaming platform, wherein the first livestreaming room is associated with a first game account in a video game and is hosted by a first livestreamer client that plays and explains the video game based on the first game account, the livestreaming page comprising a first game character controlled by the first livestreamer client based on the first game account;

in response to a second game account associated with a second livestreaming room entering a battle with the first game account in the video game, displaying information of the second livestreaming room on the livestreaming page, the second livestreaming room being hosted by a second livestreamer client that plays and explains the same video game based on the second game account; and displaying a support information bar indicating a comparison between support actions of audiences of the first livestreaming room and support actions of audiences of the second livestreaming room, the support actions of the audiences of the first livestreaming room being directed to the first livestreamer client while viewing livestreamed gaming content of the first game account in the battle on the livestreaming page, and the support actions of audiences of the second livestreaming room being directed to the second livestreamer and associated with the second game account.

2. The method according to claim 1, further comprising:

displaying a pair prompt indicating the first livestreaming account being paired with the second livestreaming account.

3. The method according to claim 1, wherein the computer device is a livestreaming client, and the method further comprising:

obtaining the first game account associated with the first livestreaming room; and transmitting the first game account to a server of the livestreaming platform.

4. The method according to claim 1, wherein the information of the second livestreaming room comprises an identity of a second livestreaming account associated with the second livestreaming room.

5. The method according to claim 1, wherein the computer device is an audience client, the information of the second livestreaming room comprises an entry of the second livestreaming room, and the method further comprises:

in response to the entry of the second livestreaming room being triggered, entering the second livestreaming room and playing an explanation of the video game by the second livestreamer client.

6. The method according to claim 1, wherein the computer device is an audience client, and the information of the second livestreaming room comprises livestreamed content of the second livestreaming room.

7. The method according to claim 6 further comprising:

displaying a livestreamed content of the first livestreaming room at a primary area of the livestreaming page; and displaying the livestreamed content of the second livestreaming room at a secondary area of the livestreaming page.

8. The method according to claim 7 further comprising:

in response to a switching operation at the audience client, switching the livestreamed content of the first livestreaming room to the secondary area and the livestreamed content of the second livestreaming room to the primary area.

9. The method according to claim 7 further comprising:

in response to a closing operation on the audience client, stopping displaying the livestreamed content of the second livestreaming room on the livestreaming page.

10. The method according to claim 1, further comprising:

in response to a second game account associated with a second livestreaming room leaving the battle with the first game account in the video game, stopping displaying information of the second livestreaming room on the livestreaming page.

11. The method according to claim 1, the support actions directed to a livestreamer client include at least one of actions of sending bullet screens, giving virtual resources, giving likes, presenting virtual items, subscribing, or opening exclusive rights.

12. The method according to claim 1, wherein the audiences of the first livestreaming room and the audiences of the second livestreaming room view livestreamed account on the livestreaming platform and do not enter the video game.

13. A computer device, comprising: a storage apparatus and one or more processors;

the storage apparatus being configured to store a computer program; and the processor executing the computer program to implement:

displaying a livestreaming page of a first livestreaming room on a livestreaming platform, wherein the first livestreaming room is associated with a first game account in a video game and is hosted by a first livestreamer client that plays and explains the video game based on the first game account, the livestreaming page comprising a first game character controlled by the first livestreamer client based on the first game account;

in response to a second game account associated with a second livestreaming room entering a battle with the first game account in the video game, displaying information of the second livestreaming room on the livestreaming page, the second livestreaming room being hosted by a second livestreamer client that plays and explains the same video game based on the second game account; and displaying a support information bar indicating a comparison between support actions of audiences of the first livestreaming room and support actions of audiences of the second livestreaming room, the support actions of the audiences of the first livestreaming room being directed to the first livestreamer client while viewing livestreamed gaming content of the first game account in the battle on the livestreaming page, and the support actions of audiences of the second livestreaming room being directed to the second livestreamer and associated with the second game account.

14. The computer device according to claim 13, further comprising:

displaying a pair prompt indicating the first livestreaming account being paired with the second livestreaming account.

15. The computer device according to claim 13, wherein the computer device is a livestreaming client, and the method further comprising:

obtaining the first game account associated with the first livestreaming room; and transmitting the first game account to a server of the livestreaming platform.

16. The computer device according to claim 13, wherein the information of the second livestreaming room comprises an identity of a second livestreaming account associated with the second livestreaming room.

17. The computer device according to claim 13, wherein the computer device is an audience client, the information of the second livestreaming room comprises an entry of the second livestreaming room, and the processor is further configured to implement:

in response to the entry of the second livestreaming room being triggered, entering the second livestreaming room and playing an explanation of the video game by the second livestreamer client.

18. The computer device according to claim 13, wherein the computer device is an audience client, and the information of the second livestreaming room comprises livestreamed content of the second livestreaming room.

19. A non-transitory computer-readable storage medium, storing a computer program which, when executed by one or more processors, causing the one or more processors to implement:

displaying a livestreaming page of a first livestreaming room on a livestreaming platform, wherein the first livestreaming room is associated with a first game account in a video game and is hosted by a first livestreamer client that plays and explains the video game based on the first game account, the livestreaming page comprising a first game character controlled by the first livestreamer client based on the first game account;

in response to a second game account associated with a second livestreaming room entering a battle with the first game account in the video game, displaying information of the second livestreaming room on the livestreaming page, the second livestreaming room being hosted by a second livestreamer client that plays and explains the same video game based on the second game account; and displaying a support information bar indicating a comparison between support actions of audiences of the first livestreaming room and support actions of audiences of the second livestreaming room, the support actions of the audiences of the first livestreaming room being directed to the first livestreamer client while viewing livestreamed gaming content of the first game account in the battle on the livestreaming page, and the support actions of audiences of the second livestreaming room being directed to the second livestreamer and associated with the second game account.

20. The non-transitory computer-readable storage medium according to claim 19, wherein the computer program further causes the one or more processors to implement:

displaying a pair prompt indicating the first livestreaming account being paired with the second livestreaming account.

* * * * *